US009873158B2

(12) United States Patent
Koegel et al.

(10) Patent No.: US 9,873,158 B2
(45) Date of Patent: Jan. 23, 2018

(54) ADJUSTMENT AND CONTROL FEATURES FOR A POWER TOOL

(71) Applicants: Robert Bosch Tool Corporation, Broadview, IL (US); Robert Bosch GmbH, Stuttgart (DE)

(72) Inventors: Jan Koegel, Oak Park, IL (US); Michael Luginbill, Troy, MI (US); Marin Assaliyski, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 366 days.

(21) Appl. No.: 14/205,664

(22) Filed: Mar. 12, 2014

(65) Prior Publication Data

US 2014/0318342 A1 Oct. 30, 2014

Related U.S. Application Data

(60) Provisional application No. 61/778,979, filed on Mar. 13, 2013, provisional application No. 61/778,616, filed on Mar. 13, 2013, provisional application No. 61/779,452, filed on Mar. 13, 2013.

(51) Int. Cl.
*B27G 19/02* (2006.01)
*B23D 45/06* (2006.01)
*B23D 59/00* (2006.01)

(52) U.S. Cl.
CPC ......... *B23D 45/068* (2013.01); *B23D 59/002* (2013.01); *B27G 19/02* (2013.01); *Y10T 83/7726* (2015.04)

(58) Field of Classification Search
CPC ..... B27G 19/00; Y10T 83/7726; Y10T 83/85; B23D 45/068; B23D 59/002
USPC .................................................. 83/477.2, 956
See application file for complete search history.

(56) References Cited

U.S. PATENT DOCUMENTS

| 4,108,105 A | * | 8/1978 | Wiggins | ................ B05B 12/122 118/323 |
| 4,637,289 A | | 1/1987 | Ramsden | |
| 5,040,444 A | | 8/1991 | Shiotani et al. | |
| 5,119,310 A | * | 6/1992 | Moriya | ................ B23D 55/086 700/192 |

(Continued)

FOREIGN PATENT DOCUMENTS

DE 102007039570 A1 3/2008
DE 102008001727 A1 11/2009

OTHER PUBLICATIONS

International Search Report and Written Opinion corresponding to PCT Application No. PCT/US2014/024032, dated Jul. 30, 2014 (13 pages).

(Continued)

*Primary Examiner* — Kenneth E. Peterson
*Assistant Examiner* — Fernando Ayala
(74) *Attorney, Agent, or Firm* — Maginot Moore & Beck LLP

(57) ABSTRACT

Improvements to a table saw include a system for automatically adjusting the height of the cutting blade in relation to the height of the workpiece, a system for providing fine adjustment of the height or bevel angle of the saw blade or work surface, and a system for automatic speed control and shut-off for the saw blade.

8 Claims, 21 Drawing Sheets

(56) References Cited

U.S. PATENT DOCUMENTS

| | | | | |
|---|---|---|---|---|
| 5,340,962 | A * | 8/1994 | Schmidt | B23K 26/04 219/121.78 |
| 5,904,867 | A * | 5/1999 | Herke | B23K 26/04 219/121.6 |
| 7,036,411 | B1 * | 5/2006 | Harris | B23D 55/04 700/167 |
| 8,311,661 | B2 * | 11/2012 | Krapf | B23D 59/001 700/174 |
| 2002/0170399 | A1 * | 11/2002 | Gass | B23D 59/001 83/62.1 |
| 2003/0226438 | A1 * | 12/2003 | Adams | B23D 49/08 83/746 |
| 2004/0262020 | A1 * | 12/2004 | Arntson | B23B 39/18 173/32 |
| 2005/0270546 | A1 * | 12/2005 | Hall | B29C 73/06 356/614 |
| 2006/0032352 | A1 * | 2/2006 | Gass | B23D 59/001 83/58 |
| 2010/0037739 | A1 | 2/2010 | Anderson et al. | |
| 2010/0147124 | A1 * | 6/2010 | Seidel | B23D 59/001 83/72 |
| 2010/0257990 | A1 * | 10/2010 | Schell | B27G 19/02 83/397 |
| 2010/0326251 | A1 * | 12/2010 | Simon | B27G 19/02 83/102.1 |
| 2011/0011225 | A1 * | 1/2011 | Krapf | B23D 45/068 83/13 |
| 2011/0100183 | A1 | 5/2011 | Tomaino | |
| 2011/0113939 | A1 * | 5/2011 | Simon | B27G 19/02 83/13 |
| 2014/0130643 | A1 * | 5/2014 | Dammertz | B27G 19/02 83/13 |

OTHER PUBLICATIONS

Supplementary Partial European Search Report corresponding to European Patent Application 14 77 9836 (7 pages).

* cited by examiner

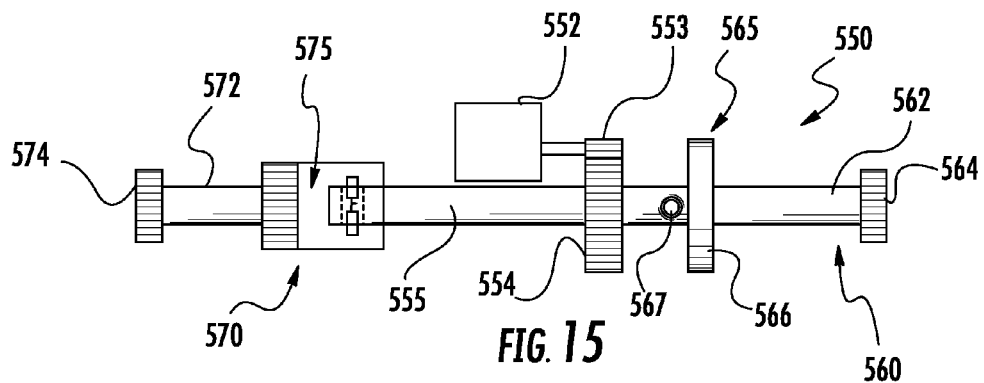
FIG. 15
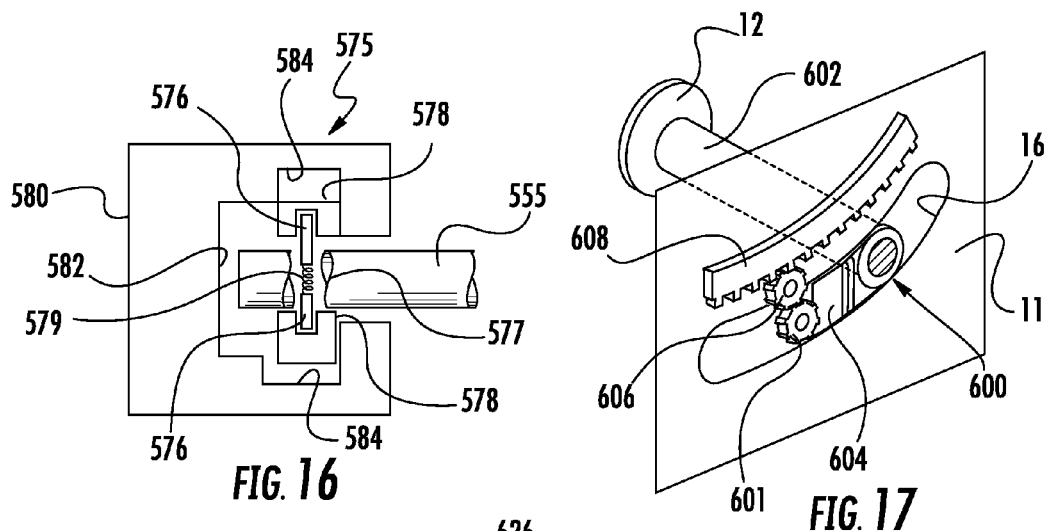
FIG. 16
FIG. 17
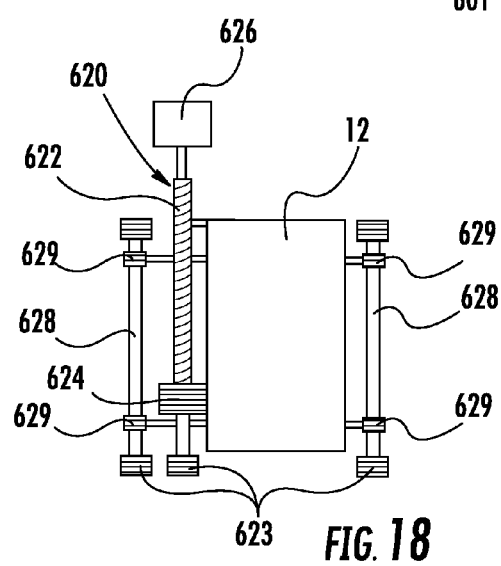
FIG. 18

ADJUSTMENT AND CONTROL FEATURES FOR A POWER TOOL

REFERENCE TO RELATED APPLICATION AND PRIORITY CLAIM

This application is a utility filing of and claims priority to U.S. Provisional Application No. 61/778,979, filed on Mar. 13, 2013, and entitled "Automatic Height Adjustment for a Power Tool", and U.S. Provisional Application No. 61/778,616, filed on Mar. 13, 2013, and entitled "Automatic Speed Control and Shut Off for a Power Tool", and U.S. Provisional Application No. 61/779,452, filed on Mar. 13, 2013 and entitled "Fine Adjustment System for Power Tools". The entire disclosure of each provisional is incorporated by reference herein in their entirety.

TECHNICAL FIELD

This disclosure relates to power tools and, more particularly, to improvements for power table saws.

BACKGROUND

Table saws are used in the construction and wood working industries. When a saw blade of a table saw comes in contact with a workpiece, e.g., a piece of lumber, to cut the workpiece, the height and angle of the blade relative to the workpiece determines the depth and angle of cut into the workpiece. Because workpieces vary significantly in size and desired cut types, it is advantageous to make saw blades adjustable relative to the work surface of the table saw, and thus adjustable relative to the workpiece supported by the work surface. An example of a prior art table saw with a height adjustment mechanism is depicted in FIG. 1.

The table saw 10 depicted in FIG. 1 includes a housing 11 supporting a table top work surface T with a saw blade S projecting through an opening O defined in the surface. The saw blade S is supported for rotation by a carriage 12 adjustably supported within the housing 11, with the carriage configured to carry a drive motor (not shown) for rotating the saw blade. The table saw 10 may further include a table extension and a rip fence as depicted in FIG. 1. The table saw 10 further includes an on/off or power switch P for energizing the drive motor to operate the saw blade. The particular position of the saw blade S relative to the table top T may be adjusted by rotating a crank wheel 14 of a height adjustment mechanism that interacts with the carriage 12 through worm gears, bevel gears, or other kinematic sliding mechanisms of the table saw 10 to adjust the vertical position V of the saw blade S. The power tool 10 further includes a bevel adjustment mechanism 15 that can be manually actuated to slide the height adjustment mechanism 14 along a curved slot 16 formed in the housing 11 to pivot the saw blade S in the direction of the arrows B. In some power tools the table top T is adjusted while the position of the blade remains vertical. In those types of power tools, the adjustment mechanisms 14, 15 may be configured to raise/lower or tilt the table top relative to the saw blade. The end result of either approach (i.e., moving the blade or moving the table top) is that the saw blade contacts the workpiece at a different height or angle.

Both adjustments of the saw blade S, vertical and bevel angle, are typically tedious and time consuming, and both mechanisms 14, 15 are difficult use to provide fine adjustments. For instance, fine vertical adjustments V require repetitive manual turning of the crank. Further, the process is imprecise and can require substantial effort to achieve the precise saw blade configuration that is desired. Finer adjustments can be accomplished by using finer toothed gearing, but at the cost of even more turning of the crank. Additionally, in some circumstances, the workpiece may not have a uniform thickness, creating difficulty to the user in manually adjusting the height or bevel angle during operation of the table saw.

Consequently, there is a need for adjustment mechanisms for the saw blade of a power tool that is easier and less time consuming to operate and that can accomplish fine adjustments. Power tools, such as power table saws, planers, miter saws, vertical saws, bevel saws, circular saws, or the like have evolved through the years to incorporate various safety mechanisms, such as blade guards, that try to prevent the operator from contacting the moving tool during an operation.

Most power tools include an on/off switch that is used by the operator to turn the power tool on and to shut the tool off after an operation is completed. The problem with the power switch is that it requires the operator to manually de-activate the switch after the cutting operation is complete, but while the tool is still operating or the saw blade is still spinning During the cut the operator's attention is fixed on the task at hand, namely to guide the workpiece through the working saw blade at a consistent horizontal speed to produce a clean cut. Once the cut is complete the operator's attention is naturally on the finished product, at a minimum to move the separated pieces of the workpiece from the working space around the cutting blade. The operator's attention is then diverted to finding the power switch to deactivate the power tool, all while the saw blade is continue to run.

Even the most attentive craftsman is prone to lapses in attention once the cut has been finished. Consequently there is a need for a need for a power tool that incorporates a feature that automatically shuts off the drive motor to the tool after a cutting operation has been completed or under other conditions indicating that the cutting tool should be de-activated.

SUMMARY

An automatic height adjustment assembly is provided for a table saw having a work surface and a saw blade. The automatic height adjustment assembly is coupled to the saw blade and configured to move the saw blade upwardly or downwardly relative to the work surface. In one embodiment, the automatic height adjustment assembly includes at least one sensor, a controller, and an actuator unit, e.g. a motor. The at least one sensor and the motor are operatively coupled to the controller. The at least one sensor is arranged relative to the power tool so as to detect the presence and outside boundaries of a workpiece adjacent to the saw blade. Upon detecting the presence and outside boundaries of a workpiece, the at least one sensor transmits signals to the controller. The controller processes the transmitted signals to determine whether to operate the motor to raise or lower the height of the saw blade relative to the work surface.

In another aspect of the present disclosure, an adjustment system is provided or adjusting the position of a tool relative to the work surface of a portable or bench top power tool. In particular the system includes a bevel adjustment component and a height adjustment component driven by a common motor. A coupling between the motor and both the adjustment components selectively engages one of the components with the motor to perform the corresponding adjustment feature. The coupling may be a torque limiting clutch, centrifugal clutch or slide actuated clutch. The coupling may be selectively engage one adjustment component or another as a function of selected motor operation parameters, such as speed and torque.

The present disclosure further contemplates an automatic speed regulation or shut-off feature for a power tool that automatically deactivates or de-energizes the drive motor for the tool in the absence of a workpiece. The feature may sense an operating condition of the drive motor that is indicative of whether the tool driven by the motor is engaged with a workpiece. The feature may also physically sense the presence of the workpiece as the cut is being performed and then provide an indication to a controller when the workpiece moves away from the sensor. The sensor may be mechanical or "touchless," and may be a stand-alone sensor or part of an overall sensor system for the power tool.

BRIEF DESCRIPTION OF THE DRAWINGS

FIG. 15 is a diagram of a motor driven combined bevel and height adjustment system according to one aspect of the present disclosure.

FIG. 16 is an enlarged cut-away view of a centrifugal clutch of the system shown in FIG. 15.

FIG. 17 is a view of a bevel adjustment component according to one aspect of the present disclosure.

FIG. 18 is a view of a height adjustment component for use with the bevel adjustment component shown in FIG. 17 in a power tool.

DETAILED DESCRIPTION OF THE EMBODIMENTS

Figure 1:
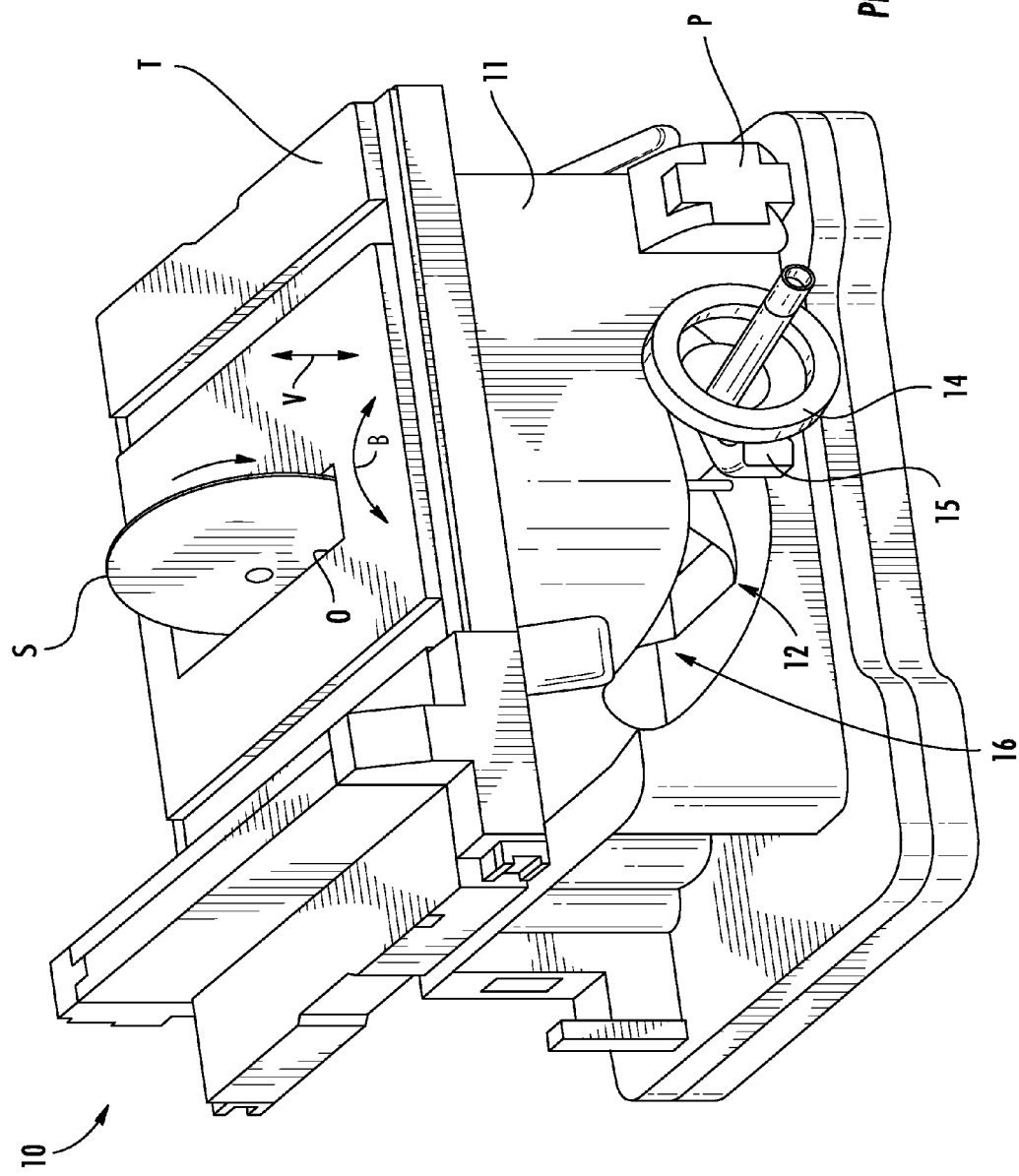
FIG. 1 depicts a top front perspective view of a prior art table saw.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
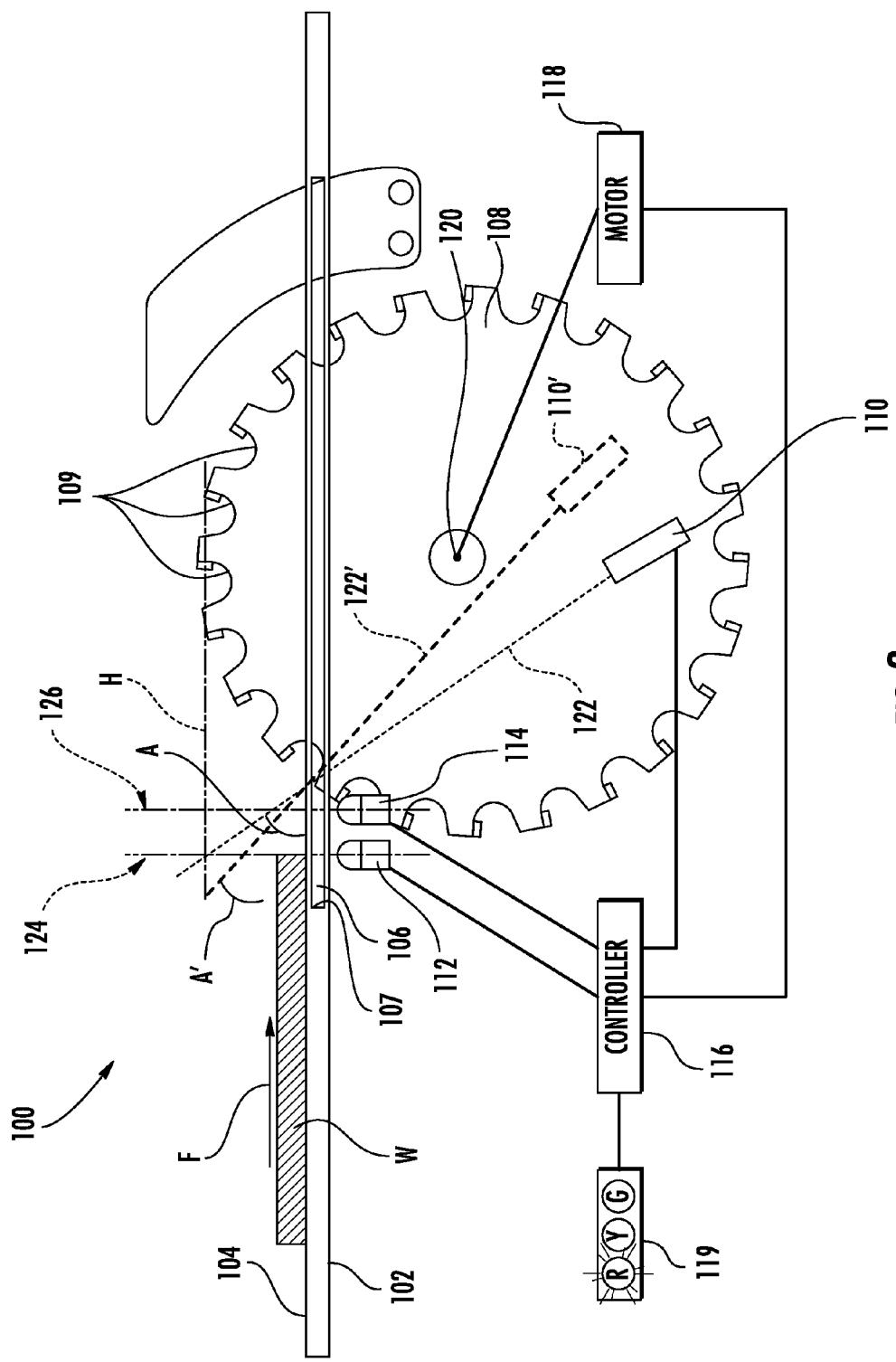
FIG. 2 depicts a schematic side view of an automatic height adjustment assembly for use in a table saw, such as the saw shown in FIG. 1, with the assembly in an initial stage of operation for reducing the blade height.

Referring to FIG. 2, an automatic height adjustment assembly 100 is depicted that is adapted for use in a power tool, such as the table saw 10 shown in FIG. 1. Alternatively, the power tool may be a planer, a miter saw, a bevel saw, a compound saw, a vertical saw, a band saw, a router, a circular saw, or the like. The automatic height adjustment assembly 100 is mounted to a support arrangement, such as the housing 11 and/or carriage 12 described above, and is movable relative to the support arrangement. As shown, the automatic height adjustment assembly 100 is situated below a table top 102 having a work surface 104 and a saw blade opening 106 and is arranged adjacent to a saw blade 108 positioned within the saw blade opening 106. The automatic height adjustment assembly 100 is configured to detect a workpiece W being fed to the saw blade 108 in a direction indicated by the arrow F.

The saw blade 108 is arranged relative to the work surface 104 such that teeth 109 of the saw blade 108 extend at a height H above the work surface 104. The height H of the teeth 109 relative to the work surface 104 determines how far into the bottom of a workpiece W the saw blade 108 will cut when the workpiece W passes over the saw blade 108. Operating the automatic height adjustment assembly 100 to raise the saw blade 108 relative to the work surface 104 causes the teeth 109 to have a greater height H such that the cut into or through the workpiece W will be farther from the bottom of the workpiece W, such as in making a through cut. Conversely, operating the automatic height adjustment assembly 100 to lower the saw blade 108 relative to the work surface 104 causes the teeth 109 to have a lower height H such that the cut into or through the workpiece W will be closer to the bottom of the workpiece W. It is contemplated that the tool operator may override the operation of the automatic height adjustment assembly 100 by feeding the workpiece W past a front of the saw blade opening 107 and into the saw blade 108 without waiting for the automatic height adjustment assembly 100 to begin operation in the manner described below. In another embodiment, a user can override the operation of the automatic height adjustment assembly 100 by operating a user interface in the form of a switch, a remote control, a touch panel, or the like.

The automatic height adjustment assembly 100 includes a sensor system having three sensors 110, 112, and 114. In this embodiment, the three sensors are a laser sensor 110, a first proximity sensor 112, and a second proximity sensor 114. In other embodiments, the three sensors can include optical sensors, light sensors, proximity sensors, motion sensors, reed sensors, acoustic sensors, camera sensors, imaging sensors, infrared light sensors, capacitive sensors, piezoelectric sensors, radar sensors, sonar sensors, ultrasonic sensors, distance measuring sensors, or the like, provided the sensors are capable of detecting the workpiece W and its position relative to the saw blade 108. In other embodiments, the sensor system can include more or fewer than three sensors.

The automatic height adjustment assembly 100 also includes a controller 116, a motor 118, and a user interface 119. The laser sensor 110, the first proximity sensor 112, and the second proximity sensor 114 are configured to detect the presence of a workpiece W and are operatively connected so as to transmit signals to the controller 116. The first and second proximity sensors 112, 114 are configured to detect the presence of a workpiece W, and more particularly to detect the leading edge of the workpiece in immediate proximity to the sensor. Since the sensors 112, 114 need only detect the passage of the bottom of the workpiece directly adjacent the opening 107 the sensors may have a very limited range. In the case of an optical sensor, the optical beam can be narrowly focused at the particular location of the proximity sensor to limit the range of the sensor to slightly more than the thickness of the table top at the opening 107. In at least one embodiment, only one sensor 112 or 114 may be used to detect the presence of or the leading edge of the workpiece W.

Figure 9:
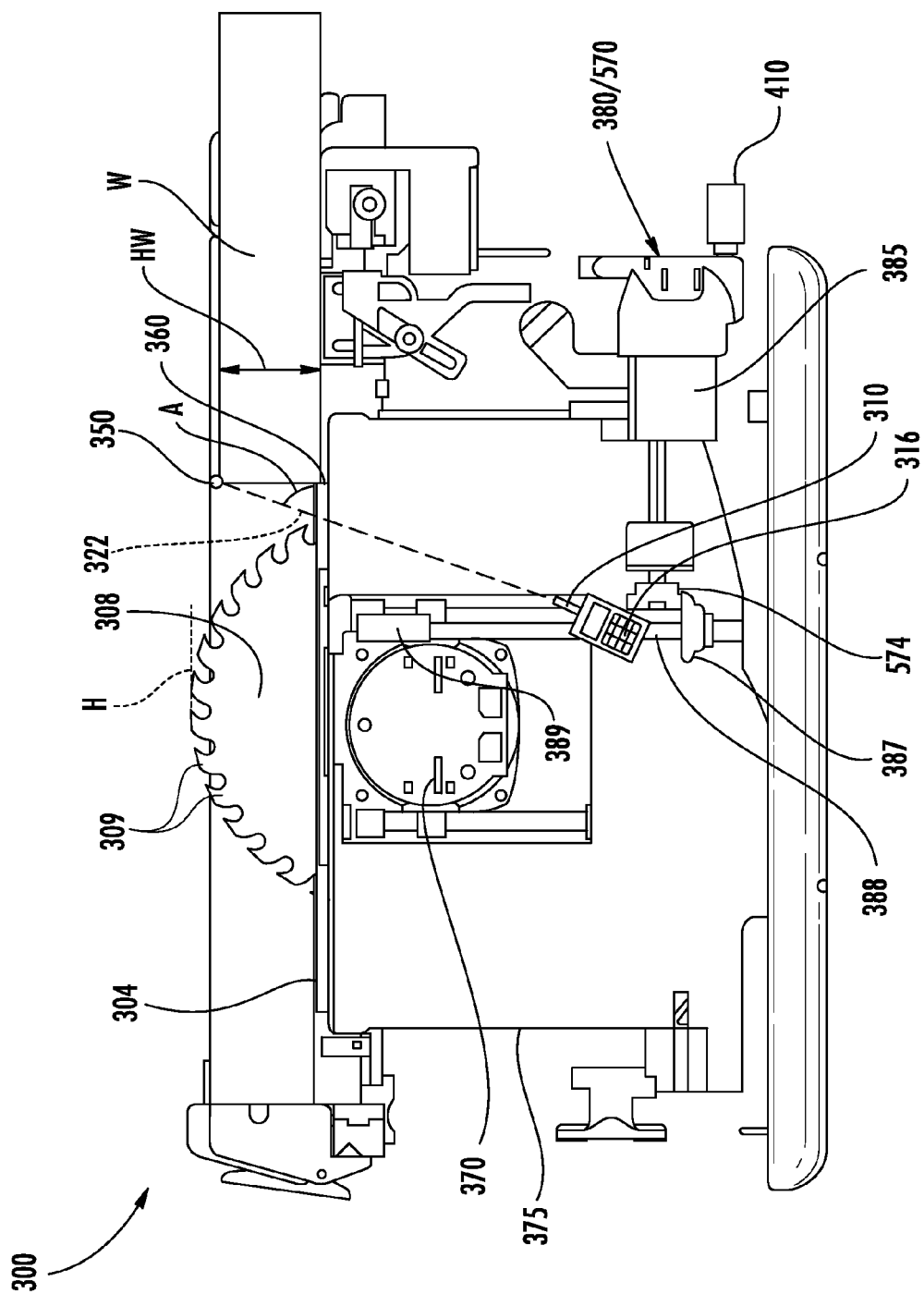
FIG. 9 depicts a schematic drawing of another automatic height adjustment assembly in a first measurement stage of operation.

The controller 116 is operatively connected to the motor 118 so as to operate the motor 118 to move the saw blade 108 relative to the work surface 104 of the table top 102. Although not shown in FIG. 2 for clarity, the motor 118 may be operatively coupled to the carriage 12 that supports the saw blade 108 and its drive motor in such a manner as to move the carriage and saw blade upwardly or downwardly without interfering with the operation of the saw blade 108. For example, in one embodiment, the motor 118 may be operatively coupled to rotate the gearing of the height adjustment assembly 14 shown in FIG. 1, replacing or at least over-riding the hand crank shown in the figure. An exemplary carriage 375 is shown in FIG. 9 that supports a drive motor 370 and the saw blade 308, as discussed in more detail herein. A height adjustment mechanism 380 may be provided with the manual crank 14 to permit manual adjustment of the blade height. The adjustment mechanism 380 includes gearing 385 that can be driven by the motor 118 for automatic blade height adjustment.

As depicted in FIG. 2, the laser sensor 110 is positioned alongside the saw blade 108 below the rotation axis 120 of the saw blade. The position of the laser sensor 110 is in fixed relation to the saw blade 108 so that the laser sensor moves upwardly and downwardly with the saw blade 108 relative to the work surface. The laser sensor 110 may thus be mounted to the carriage supporting the saw blade. In alternative embodiments, the laser sensor 110 can be integrated into the saw blade 108 or can be fixedly mounted to a blade arbor along the rotation axis 120 of the saw blade 108. The laser sensor 110 includes a laser emitter configured to emit a light beam 122 that passes through the saw blade opening 106 in a direction parallel to the plane of the saw blade 108 and at an angle A relative to the work surface 104. The angle A is oriented so that the sensor 110 can detect when a workpiece W is aligned with the first proximity sensor 112. The laser sensor 110 further includes a receiver that receives the reflected laser light and transmits a signal to the controller 116 indicating the presence or absence of an object in the path of the beam 122.

The first proximity sensor 112 is positioned below the table top 102 at the saw blade opening 106 and arranged to emit a beam of light 124 that passes through the saw blade opening 106 in a direction substantially perpendicular to the work surface 104. The first proximity sensor 112 is positioned near the front of the saw blade opening 107 so as to detect when a workpiece W is adjacent to but not yet in contact with the saw blade 108. Upon detecting the reflected light beam 124, the first proximity sensor 112 transmits a signal to the controller 116 indicating that it detects the presence of an object in the path of the light beam 124.

The second proximity sensor 114 is positioned below the table top 102 at the saw blade opening 106 and is positioned nearer to the rotation axis 120 and farther from the front of the saw blade opening 107 than the first proximity sensor 112—i.e., between the saw blade and the first sensor. The second proximity sensor is configured to emit a beam of light 126 that passes through the saw blade opening substantially perpendicular relative to the work surface 104 so as to detect when a workpiece W is being fed into contact with the saw blade 108. Upon detecting the reflected light beam 126, the second proximity sensor 114 is configured to transmit a signal to the controller 116 indicating that it detects the presence of an object in the path of the light beam 126. The controller may be configured to commence a cutting operation (i.e., by activating the motor-driven cutting blade) if the second proximity sensor indicates the presence of the workpiece at that position.

Figure 3:
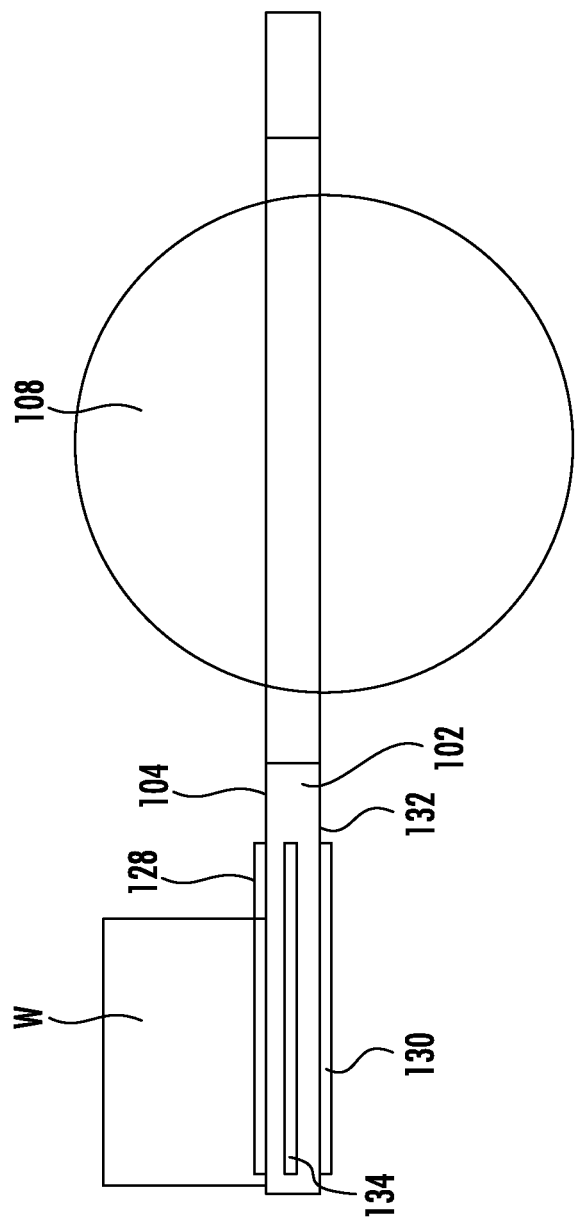
FIG. 3 depicts a schematic side view of an alternative automatic height adjustment assembly for use in a table saw such as the saw shown in FIG. 1.

In an alternative embodiment, shown in FIG. 3, the sensor system can include a sensor strip 128 applied on the work surface 104 of the table top 102, a sensor strip 130 applied to the bottom surface 132 opposite the work surface 104 of the table top 102, and/or a sensor strip 134 integrally formed within the table top 102 between the work surface 104 and the bottom surface 132. The sensor strip(s) 128, 130, and/or 134 are used to detect the presence of the workpiece W. The sensor strip(s) 128, 130, and/or 134 can also be used to identify other properties of the workpiece W such as dimensions, material type, thickness, motion, and/or speed toward and away from the saw blade 108 of the workpiece W.

Figure 4:
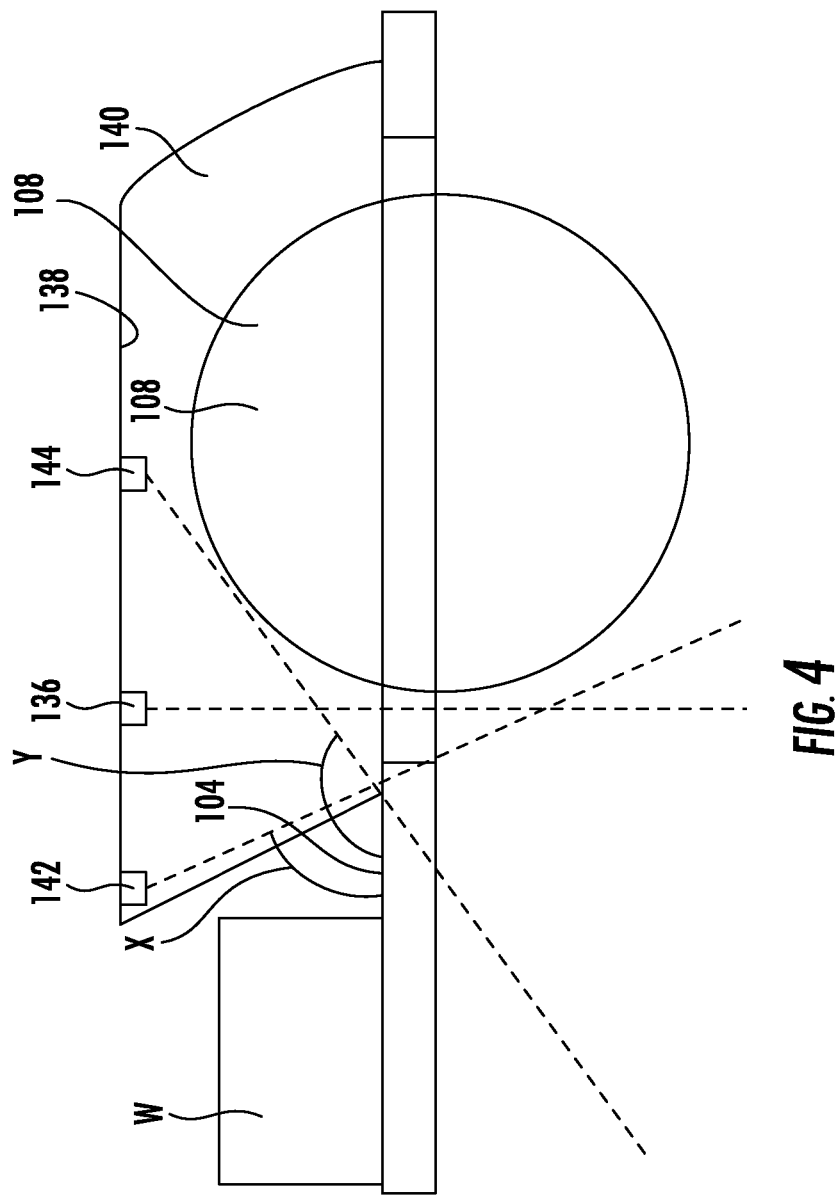
FIG. 4 depicts a schematic side view of another alternative automatic height adjustment assembly for use in a table saw like that of FIG. 1.

In another alternative embodiment, shown in FIG. 4, the sensor system can include a sensor 136 mounted to a top panel 138 of a blade guard 140 and pointed in a direction substantially perpendicular to and downward toward the work surface 104, a sensor 142 mounted to the top panel 138 of the blade guard 140 and pointed downward at an acute angle X relative to the work surface 104, and/or a sensor 144 mounted to the top panel 138 of the blade guard 140 and pointed at an obtuse angle Y relative to the work surface 104. The sensor(s) 136, 142, and/or 144 may all be used to detect the presence of the workpiece W in lieu of the sensors 112, 114 of FIG. 2.

Returning to FIG. 2, the controller 116 is configured to receive signals transmitted by the laser sensor 110, the first proximity sensor 112, and the second proximity sensor 114 and to evaluate the signals according to a program or software instructions executed by the controller to determine whether to operate the motor 118 to move the saw blade 108 up or down relative to the work surface 104 to thereby increase or decrease the height H of the teeth 109 relative to the work surface 104. The controller 116 may incorporate a memory configured to store information indicating the direction and/or magnitude of the last adjustment performed by the automatic height adjustment assembly 100.

Figure 5:
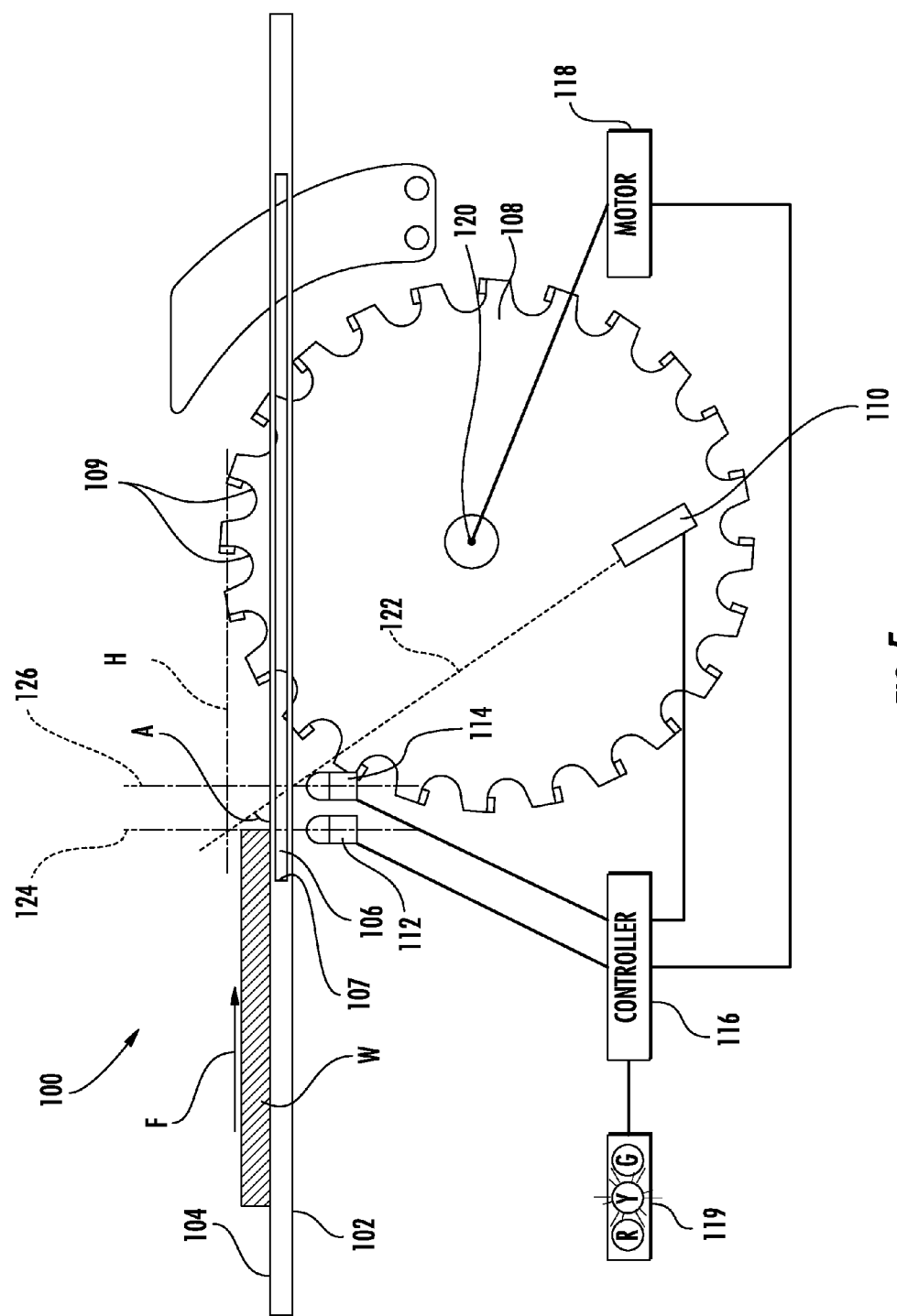
FIG. 5 depicts a schematic drawing of the automatic height adjustment assembly of FIG. 2 in an adjustment stage of operation.
Figure 6:
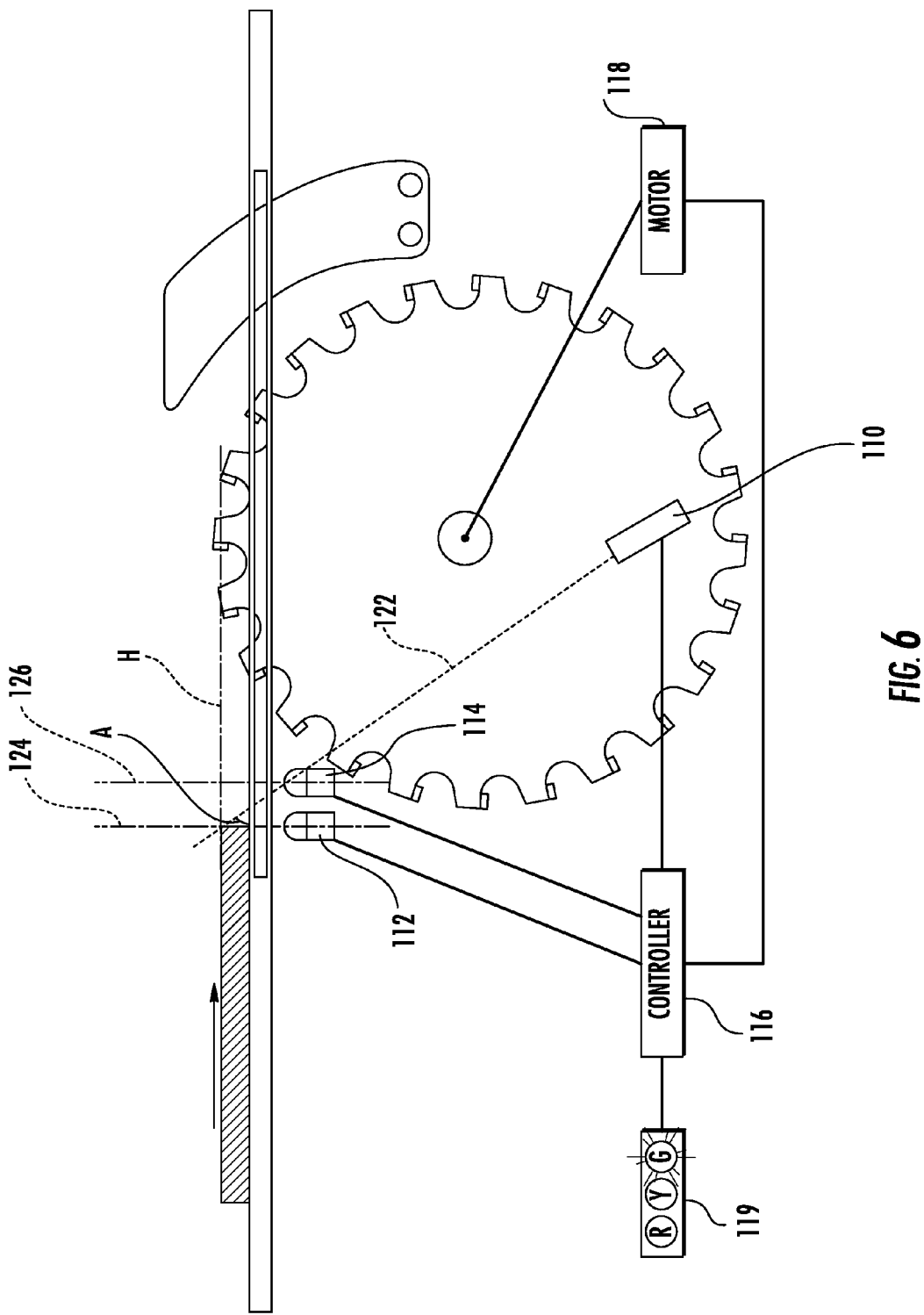
FIG. 6 depicts a schematic drawing of the automatic height adjustment assembly of FIG. 2 in a cut-ready stage of operation after lowering the blade height to the workpiece height.

In a first example, shown in FIGS. 2, 5 and 6, the controller 116 is shown operating the motor 118 to lower the saw blade 108 relative to the work surface 104 to decrease the height H of the teeth 109 relative to the work surface 104. As shown in FIG. 2, a workpiece W intercepts the light beam 124 emitted by the first proximity sensor 112 causing the sensor to send a signal to the controller that it has detected the presence of the workpiece W adjacent to the saw blade opening 106. In response the controller can direct the user interface 119 to initiate a display to indicate to the tool operator that the workpiece is properly positioned for a height adjustment. For example, the display may be a red light or diode that is energized on the user interface 119 to provide the tool operator with a visual "stop" signal to induce the operator to hold the workpiece at the location as the system and controller perform additional steps. In this example, the workpiece W does not pass through the light beam 126 emitted by the second proximity sensor 114 so the controller does not commence the cutting operation.

As shown in FIG. 2, the workpiece W does not intersect the light beam 122 emitted by the laser sensor 110. The sensor data transmitted to the controller is interpreted by the controller to indicate the presence of a workpiece and that the saw blade is positioned at a height that is above the maximum height of the workpiece. Accordingly, the controller 116 determines that the workpiece W is shorter than the current blade height H of the teeth 109 and that a blade height adjustment is required. The controller 116 directs the user interface 119 to display an indicator, such as a yellow light shown in FIG. 5, signifying that a height adjustment has commenced and then begins to operate the motor 118 to move the saw blade 108 downwardly relative to the work surface 104. The controller further stores information indicating that the blade movement is downward. In the position shown in FIG. 5, the workpiece W also still does not intersect the light beam 122 emitted by the first laser sensor 110. Accordingly, the controller 116 continues to indicate the presence of a workpiece W but that the workpiece W is still below than the blade height H. Thus, the yellow indicator on display 119 remains activated as the controller continues to operate the motor 118 to move the saw blade 108 downwardly relative to the work surface 104. The yellow indicator provides a visual indication to the operator to still hold the workpiece in position. However, it is understood that the operator could override the height adjustment operation at any time by advancing the workpiece to intersect the beam 126 of the second proximity sensor 114, in which case the controller can direct the saw blade to be activated.

In the position shown in FIG. 6 the workpiece W has now intersected the light beam 122 emitted by the laser sensor 110 so that the laser sensor 110 detects that the blade height is aligned with the maximum height of the leading edge of the workpiece W and transmits an appropriate signal to the controller. The controller 116 receives the transmitted signals and retrieves from memory the indication that the automatic height adjustment assembly 100 has been moving downwardly. Accordingly, the controller 116 determines that the height adjustment process is complete and that the cutting operation can commence. The controller can direct the user interface 119 to display an indicator, such as a green light or diode, signifying to the operator that the cutting operation can begin. The controller 116 further stops the motor 118 so that the saw blade 108 remains vertically fixed relative to the work surface 104. Once the operator sees the green light on the user interface 119, the operator can activate the drive motor for the saw blade 108. Alternatively, the controller can be configured to automatically activate the saw blade once the height adjustment operation is completed. Or once the workpiece W has been moved to intersect the beam 126 of the second proximity sensor 114.

Figure 7:
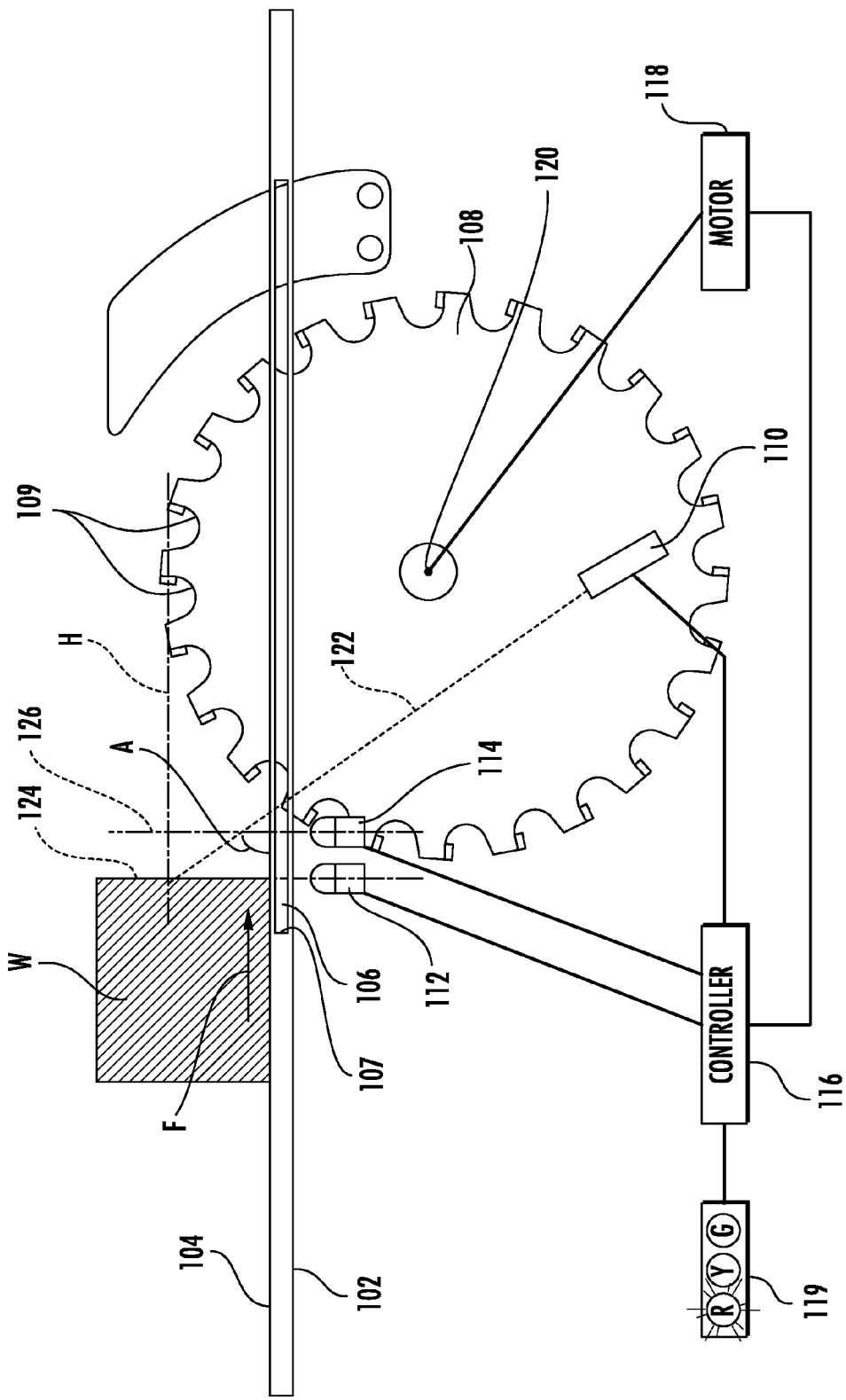
FIG. 7 depicts a schematic drawing of the automatic height adjustment assembly of FIG. 2 in another initial stage of operation for raising the blade height.

In certain instances, the maximum height of the leading edge of the workpiece is above the blade height. Thus, as shown in FIG. 7, when the workpiece W is first advanced toward the opening 106, the workpiece passes through the light beam 124 of sensor 112 and the light beam 122 of laser sensor 110. The controller interprets the simultaneous signals from the two controllers as an indication that the workpiece is taller than the blade height H so that height adjustment is required. Moreover, based on these two sensor signals the controller 116 determines that the cutting blade needs to be raised, so the controller 116 activates the motor 118 to move the saw blade 108 upwardly relative to the work surface 104. The controller operates in the same manner as described with respect to FIGS. 5 and 6 until the beam 122 is no longer intersected by the leading edge of the workpiece. When the blade is being moved downward, the controller interprets the lack of signal from the sensor 110 as an indication that the blade has been lowered to a height that equals the height of the workpiece. At this point, the motor 118 is deactivated and the green light illuminated signaling to the operator that the workpiece can be advanced to the spinning saw blade.

In the examples, the blade height H is shown as generally vertically aligned or coincident with the maximum height of the leading edge of the workpiece W. In certain cutting operations it is desirable for the blade height to be greater than the workpiece height or thickness. For instance, in certain operations it is desirable for the blade height to be about 125%-133% of the workpiece height/thickness. The controller may be configured to implement software that can determine the actual height of the workpiece W based on the final position of the laser sensor or saw blade after the blade height adjustment operation, and then calculate an offset blade height that is 25-33% greater than the actual height. The controller may then move the saw blade upward to the offset height prior to completion of the blade adjustment operation. Alternatively, the controller 116 may be configured to automatically move the blade upward a predetermined distance once the controller determines that the blade height equals the workpiece height. The user interface 119 may permit the operator to enter a value for a preferred height offset, which value is used by the controller software to direct the blade height adjustment operation.

As shown in FIG. 2, for instance, the laser sensor 110 may be oriented at an angle A at which the light beam 122 passes through the intersection of the blade height H and the light beam 124 of the first proximity sensor. In this orientation, the blade height H will coincide with the height of the leading edge of the workpiece, as reflected in FIG. 4. Alternatively, the laser sensor 110' may be oriented at an angle A' that is shallower than the angle A so that the light beam 122' intersects the first proximity sensor beam 124 at a position vertically lower than the blade height H. This modified laser sensor orientation essentially incorporates a fixed blade height offset. In other words, once the laser sensor at the modified angle reaches the upper edge of the workpiece, the actual blade height H will be above the workpiece by the predetermined offset, such as the 25-33% offset discussed above. It can be appreciated that the sensor 110' may be oriented at a greater angle so that the light beam 122' intersects the first proximity sensor beam 124 at a height that is less than the blade height H. In this instance, the saw blade would create a blind cut that does not pass entirely through the workpiece W.

Figure 8:
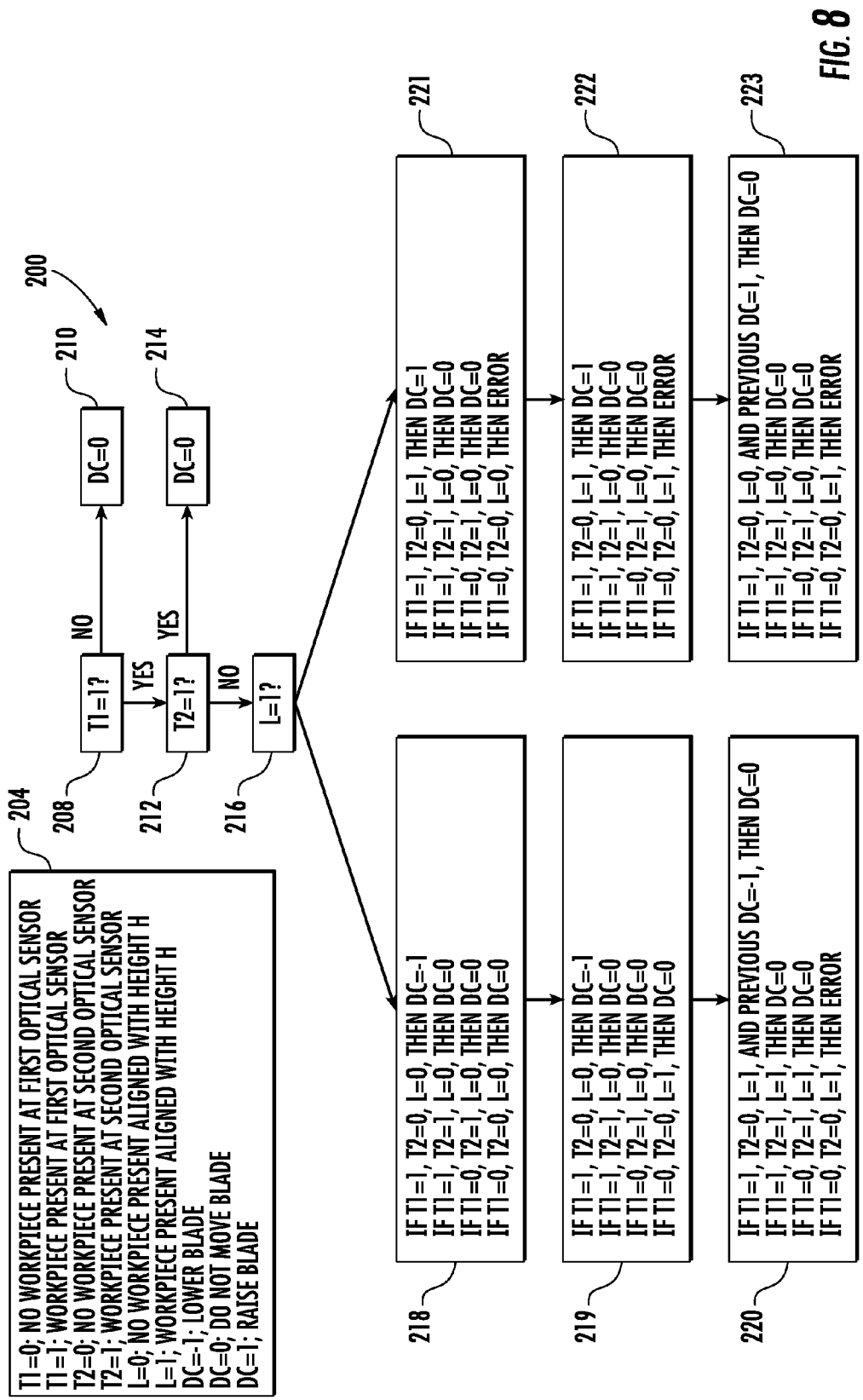
FIG. 8 depicts a flowchart of steps for operating the automatic height adjustment assembly of FIG. 2 and FIGS. 5-7.

As shown in FIG. 8, a software program 200 can be implemented by the controller 116 to control the motor 118 for moving the saw blade based on the signals from the proximity sensors 112, 114 and the laser sensor 110. As shown in the table 204, the first proximity sensor is designated T1 and the second proximity sensor as T2. The two sensors generate a "0" or a "1" signal indicative of whether or not the workpiece is present at the location of the respective sensor. The laser sensor is designated as L in the table 204 and also generates a "0" or a "1" based on whether or the workpiece intersects the beam 122. The controller generates a motor control signal DC that can be null (0) for no activation of the motor 118, −1 to operate the motor in one direction to lower the blade, and +1 to operate the motor in the opposite direction to raise the saw blade. In this embodiment, the motor 118 for moving the saw blade may be operated using digital signals. In alternative embodiments, the motor 118 can be operated using analog electrical signals or mechanical signals.

The program 200 first determines whether the first proximity sensor 112 detects the presence of a workpiece W (step 208). If the first proximity sensor 112 does not detect a workpiece (T1=0), the control signal DC from controller 116 is null (0) so that the motor 118 is not activated (step 210). If the first proximity sensor 112 does detect the presence of a workpiece (T1=1), the program 200 continues to determine whether the second proximity sensor 114 detects the presence of a workpiece W (step 212). If the second proximity sensor 114 does detect the presence of a workpiece W (T2=1), the motor control signal DC is again null and the controller does not activate the motor 118 to move the saw blade 108 (step 214). It is understood that a second sensor value T2=1 means that the operator is moving the workpiece to the saw blade and a cutting operation is being performed, in which case the blade height cannot be adjusted.

If the second proximity sensor 114 does not detect the presence of a workpiece W in step 212, the next determination is whether the laser sensor 110 detects the presence of a workpiece W (step 216). The sensor values determine which of the outputs 218-223 is implemented, and in particular whether and in what direction the height adjustment motor 118 is activated. The outputs 218-220 correspond to the blade and laser sensor orientations shown in FIGS. 2, 5, 6 in which the blade is lowered, while the outputs 221-223 correspond to FIG. 7 in which the blade is raised. The output 218 corresponds to FIG. 2 in which the workpiece is being moved toward the first proximity sensor 112 (T1). A motor command signal DC is only generated if T1=1 and if T2 and L are null, meaning that the workpiece is at the location of sensor 112 and have not been advanced toward the blade, and that the blade height is above the workpiece. In this instance, the motor command is −1 signifying that the motor 118 is operated in the direction to lower the blade height. In all other conditions, specifically if T1 is null or T2=1, the adjustment motor is not energized.

As the motor 118 operates to lower the saw blade, the controller produces output 219. The motor control signal DC remains −1 (i.e., moving downward) so long as the laser sensor signal L and second proximity sensor signal T2 remain null. However, once the blade height reaches the height of the workpiece, the laser sensor signal changes to L=1, in which case the controller switches the control signal DC to null. The saw blade and workpiece are now in the position shown in FIG. 6 at which the blade height is adjusted to the workpiece height. Under all conditions the motor control signal DC is null or is changed to null. However, as reflected in output 220, the control signal DC becomes null only if the previous DC was −1. This conditional takes into account that situation in which the workpiece is taller than the blade height (as in FIG. 7) which requires lowering of the workpiece. In this sequence the blade height Has been reduced so the new detection of the workpiece by the laser sensor means that the height adjustment is complete. It can be noted that if the laser sensor indicates the presence of a workpiece but neither of the proximity sensors show a workpiece, an error condition is noted and the height adjustment motor is de-energized. In this condition, the blade drive motor may also be de-energized.

The outputs 221-223 correspond to adjusting the blade height upward as depicted in FIG. 7. The output protocol is similar to the outputs 218-220, except that the motor control signal DC is +1, rather than −1, so that the motor 118 moves the blade upward to increase the blade height. In the output 223, once the laser sensor no longer detects the workpiece the controller determines that the height of the workpiece has been reached and then so long as the motor had been driving the blade upward (DC=1) the motor control signal DC is made null.

It is understood that the program 200 and the outputs 218-223 can be readily implemented in a microprocessor using C++ programming language. Alternatively, a more sophisticated controller may incorporate the program steps of FIG. 8 as well as perform the height offset calculations described above. Additionally, alternative programming languages can be used.

Turning now to FIG. 9, an automatic height adjustment assembly 300 is depicted. The automatic height adjustment assembly 300 is substantially similar to the automatic height adjustment assembly 100 described above except that the assembly 300 includes only one sensor device used to detect the presence of the workpiece W. In this embodiment, the sensor device is a laser sensor 310. In alternative embodiments, however, the sensor device is a distance measuring device or another type of sensor as indicated above. The controller 316 that receives signals from the laser sensor 310 is mounted to the carriage 375 that supports the saw blade 308 and drive motor 370. As in the assembly 100, the laser sensor is oriented at an angle A relative to the plane of the work surface 304 and is aligned to pass through the saw blade opening. More specifically, the laser sensor 310 is arranged so that the light beam 322 first detects a top leading edge 350 of the workpiece W as it is fed toward the blade 308. In this embodiment, the laser sensor 310 is capable of generating a distance value from the sensor to the detected object. Upon detecting the top leading edge 350, the laser sensor 310 generates a first signal (i.e., L=1 in FIG. 8) to the controller 316 indicating the presence of the workpiece, as well as a distance value D1. A time value Time1 is also generated corresponding to the time at which the top leading edge 350 is detected. The time value Time1 may be generated by the controller 316.

Figure 10:
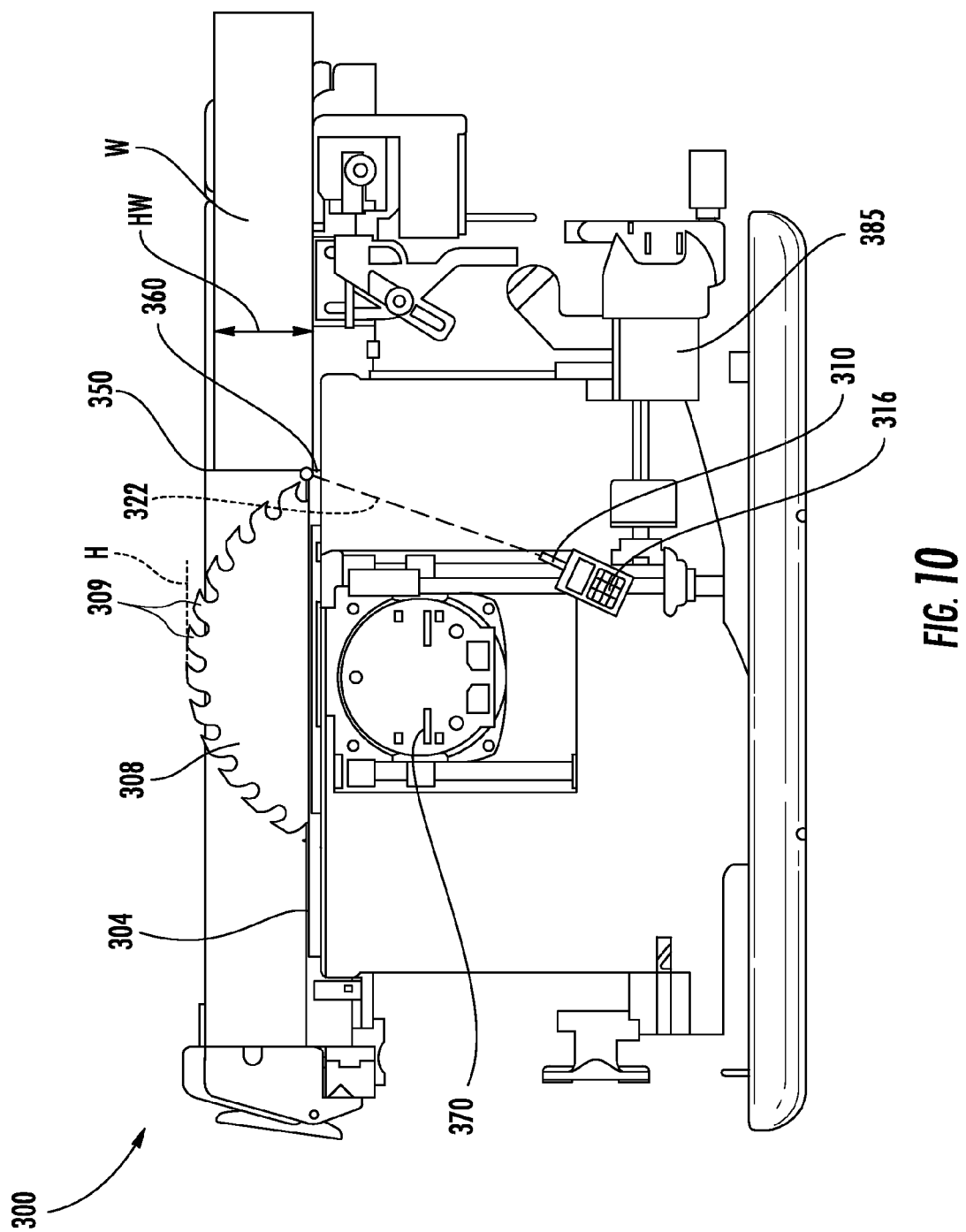
FIG. 10 depicts a schematic drawing of the automatic height adjustment assembly of FIG. 9 in a second measurement stage of operation.

As shown in FIG. 10, as the workpiece W is further fed toward the saw blade 308, the light beam 322 emitted by the laser 310 then detects the presence of the bottom leading edge 360. Upon detecting the bottom leading edge 360, the laser sensor generates a distance value D2 and a time value Time2 is generated by the controller. It can be appreciated that at this point the laser sensor is also still generating a detection value L=1 because the workpiece is still intercepting the light beam 322. Once the bottom leading edge is detected further movement of the workpiece toward the blade does not produce any change in the distance value. Once the controller determines that the distance detected by the laser sensor is unchanged the distance value D2 can be assigned.

The controller 316 is configured to evaluate the first signal and the second signal to determine the workpiece height $H_w$, specifically using the distance values D1 and D2. As shown, the angle A of the light beam 322 is known and the difference between distances D1 and D2 is known so the workpiece height can be calculated using the equation $H_w=\sin(A)*(D2-D1)$. Once the controller 316 has determined the workpiece height $H_w$, the controller 316 operates the motor to move the saw blade 308 relative to the work surface 304 such that the blade height H of corresponds to the workpiece height $H_w$. It can be appreciated that the starting blade height is known so that the controller can determine whether the blade adjustment requires upward or downward movement. As discussed above, a blade height offset may be desirable, in which case the controller 316 may automatically apply the correction as the blade is moved to the desired height.

Figure 11:
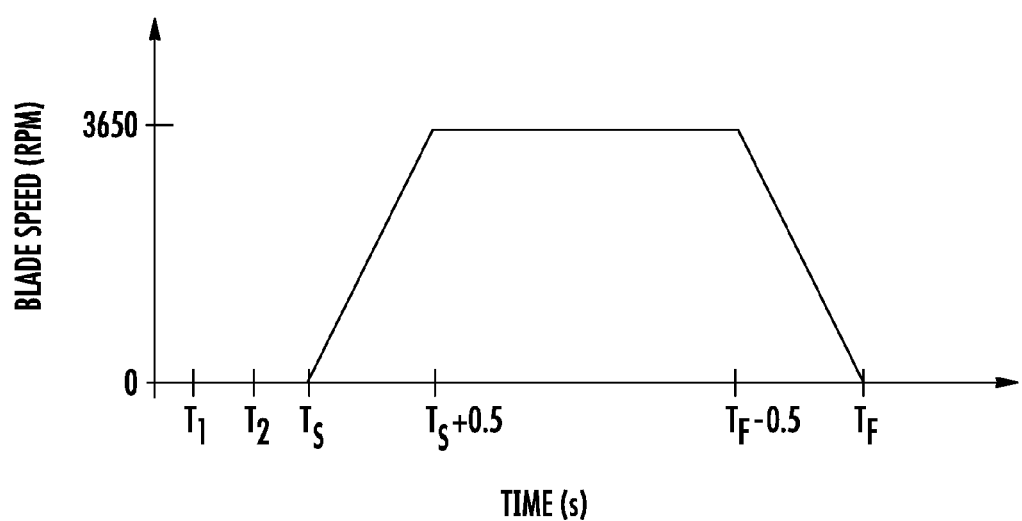
FIG. 11 depicts a blade speed profile graph implemented by a controller of the automatic height adjustment assembly disclosed herein.

Additionally, the controller 316 can determine the velocity $V_w$ at which the workpiece W is being fed toward the saw blade 308. Again, the angle A of the light beam 322 is known and the difference between distances D1 and D2 is known. Accordingly, the controller 316 calculates the workpiece velocity $V_w$ using the equation: $V_w=((D2-D1)*\cos(A))/(T2-T1)$. With the workpiece velocity $V_w$, the controller 316 can control the saw blade motor 370 to adjust the rotational speed of the saw blade 308 according to a predetermined speed profile, such as the profile shown in FIG. 11 that is expedient to the user. Thus according to the profile in FIG. 11, the blade may be actuated at a predetermined start time after Time2, with the motor speed gradually increasing to a desired operating speed. The laser sensor remains operative as the cut is being made so that once the trailing end of the workpiece passes from the light beam 322 the sensor 320 sends a null signal L=0 to the controller which initiates the shut-down sequence. According to the profile in FIG. 11, the blade runs at its full operating speed for a predetermined delay after time after which the blade speed is gradually reduced until the drive motor 370 is de-energized at time Tf.

Both the automatic height adjustment assembly 100 and the automatic height adjustment assembly 300 can be over-ridden by a user who either disables the automatic height adjustment assembly 100, 300 or who feeds the workpiece W into the saw blade 108, 308 without waiting for the height adjustment sequence to commence. As explained above, with respect to the assembly 100, detection by the second proximity sensor T2=1 prevents activation of the height adjustment motor and signals that the user is overriding the adjustment sequence. Alternatively, the controller may be provide the ability to turn the auto-adjust feature on or off, or may be configured to allow over-riding a default condition of automatic blade height adjustment. The user is still able to adjust the height of the teeth of the saw blade using a manual crank.

Figure 12:
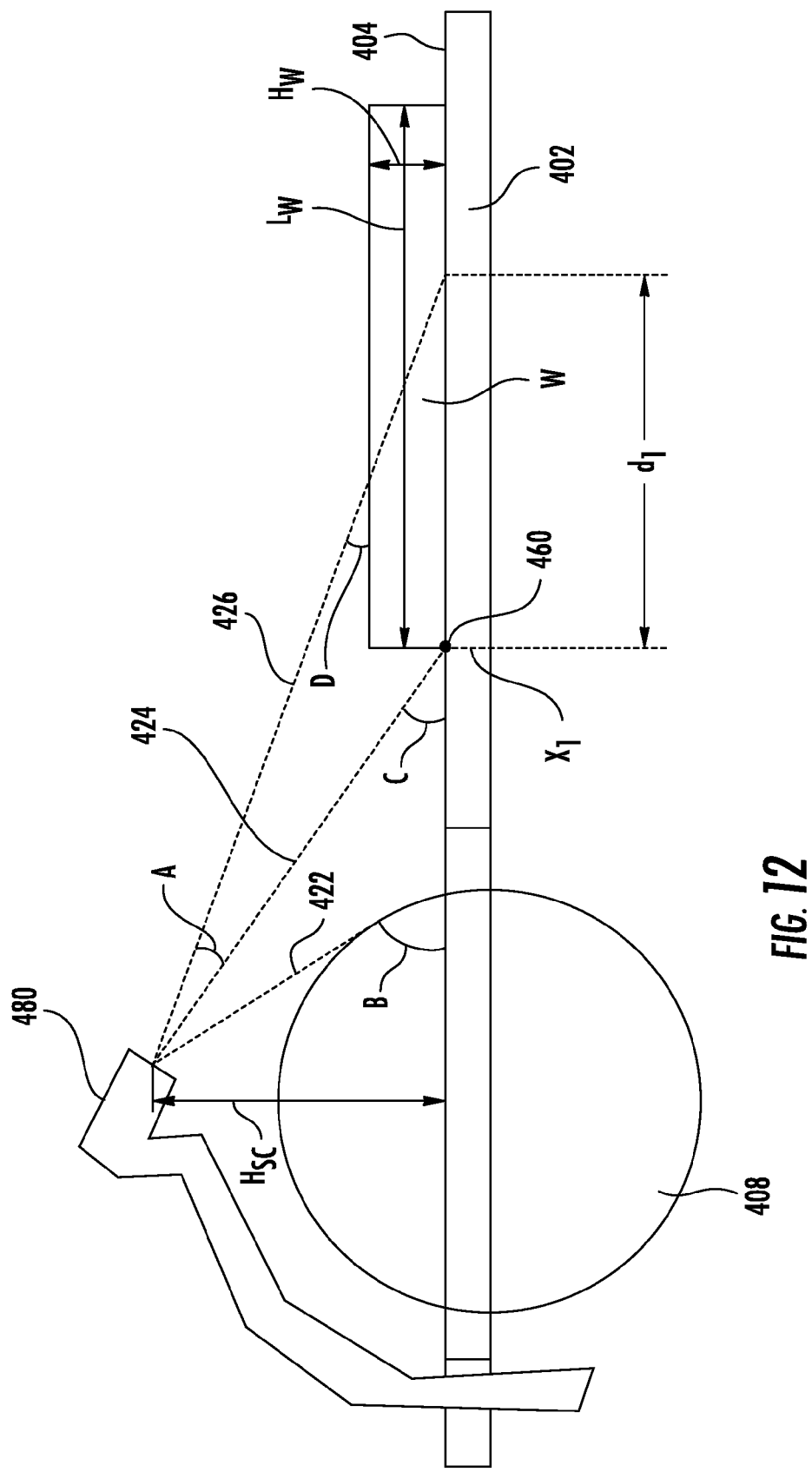
FIG. 12 depicts a schematic drawing of an automatic height adjustment assembly according to a further aspect of the present disclosure, shown in a first measurement stage of operation.
Figure 13:
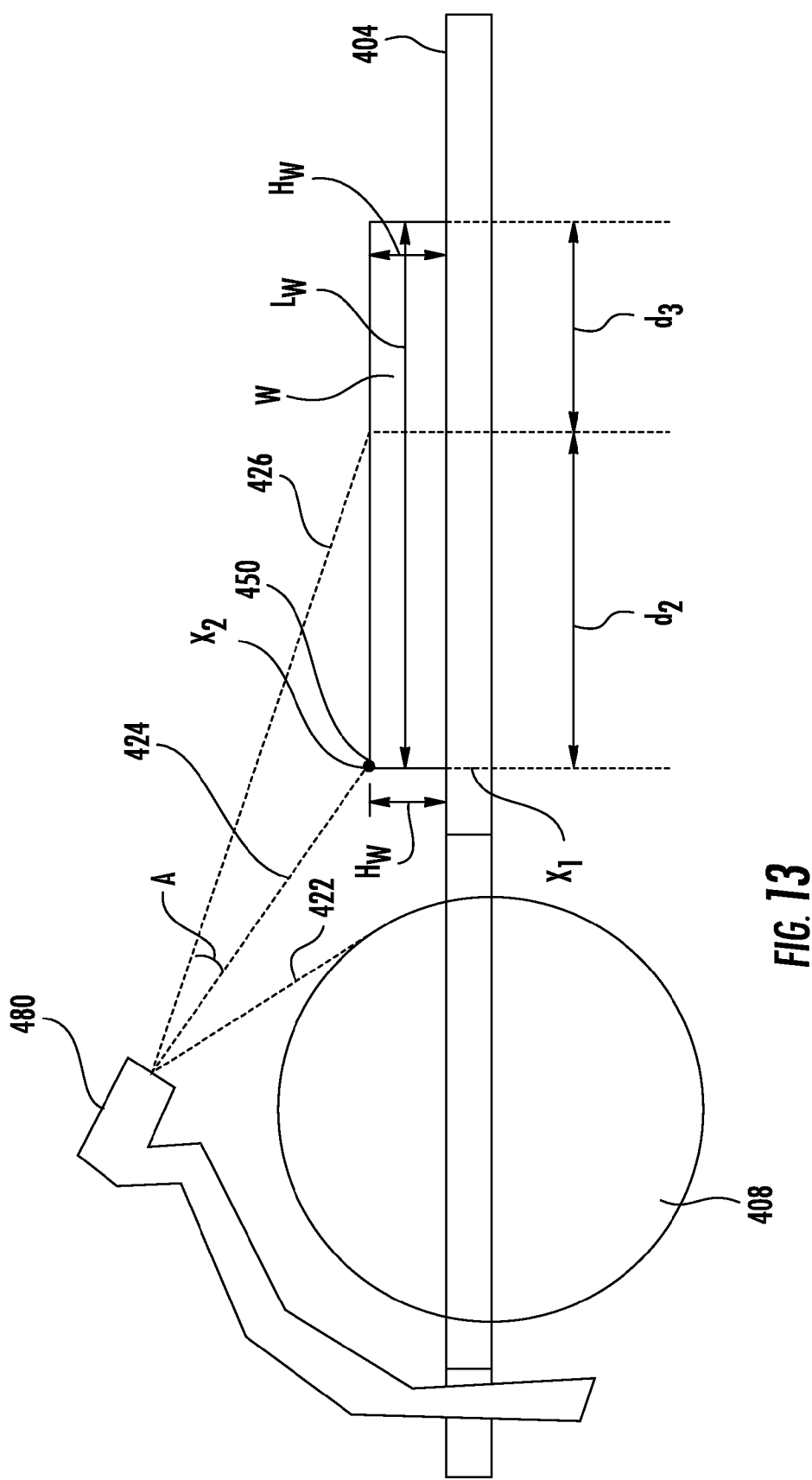
FIG. 13 depicts a schematic drawing of the automatic height adjustment assembly of FIG. 12 in a second measurement stage of operation.
Figure 14:
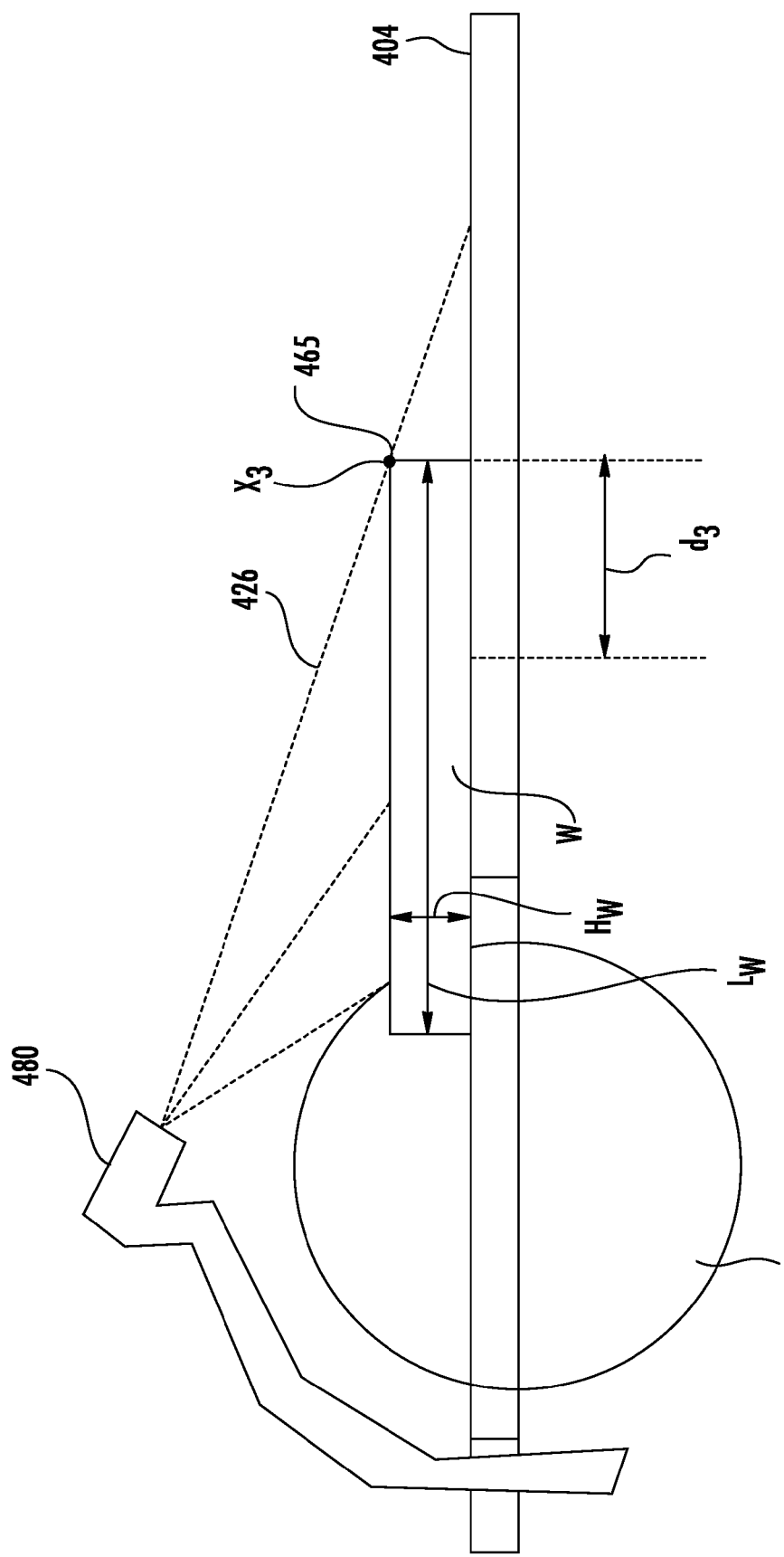
FIG. 14 depicts a schematic drawing of the automatic height adjustment assembly of FIG. 13 in a third measurement stage of operation.

Turning now to FIGS. 12-14, an automatic height adjustment assembly 400 is depicted that is operable to not only adjust the blade height but also to sense workpiece length and detect when a cut is complete. The automatic height adjustment assembly 400 is substantially similar to the automatic height adjustment assembly 300 described above except that the assembly 400 includes a sensor compartment 480 positioned above the saw blade 408 and housing three sensor devices used to detect the presence and dimensions of a workpiece. In this embodiment, the three sensor devices are each laser sensors configured to emit a beam of light 422, 424, and 426, respectively. In alternative embodiments, however, the sensor devices can be another type of sensor as indicated above. The sensor compartment 480 is mounted to the carriage that supports the saw blade 408 and drive motor such that the sensor compartment 480 moves vertically with the saw blade 408. As in the assembly 300, the sensor devices are oriented at angles such that the beams of light 422, 424, and 426 are oriented at fixed angles B, C and D, respectively, relative to the plane of the work surface 404. Because the angles C and D are known, the angle A between the beams 424 and 426 is known. Thus, because the angles A, C and D are known, the distance $d_1$ between the beams of light 424 and 426 on the work surface 404 is known when the height $H_{sc}$ of the sensor compartment 480 relative to the work surface is known.

As shown in FIG. 12, the sensor compartment 480 is arranged so that the light beam 424 detects a bottom leading edge 460 of the workpiece W as the workpiece W is fed toward the blade 408. Upon detecting the bottom leading edge 460, the sensor device that emits light beam 424 generates a distance value X1 and sends a corresponding signal to the controller. A time value Time1 is also generated corresponding to the time at which the bottom leading edge 460 is detected. The time value Time1 may be generated by the controller.

As shown in FIG. 13, as the workpiece W is further fed toward the saw blade 408, the light beam 424 then detects the presence of the top leading edge 450. Upon detecting the top leading edge 450, the sensor device that emits light beam 424 generates a distance value X2 and sends a corresponding signal to the controller and a time value Time2 is generated. When the signal corresponding to the distance value X2 is transmitted to the controller, the controller begins operating the sensor device that emits light beam 422 to act as an automatic shut-off. Once the sensor device that emits the light beam 422 is activated, a detected absence of a workpiece W following a detected presence of a workpiece W by the light beam 422 will cause the sensor device that emits light beam 422 to send a signal to the controller initializing a speed reduction or automatic shut-off protocol for the saw blade motor. Additionally, when the signal corresponding to the distance value X2 is transmitted to the controller, the controller also begins operating the sensor device that emits light beam 426 to detect an absence of the workpiece W.

Turning now to FIG. 14, as the workpiece W is further fed toward the saw blade 408, the light beam 426 then detects the absence of the workpiece W once the top trailing edge 465 of the workpiece W passes through the beam. Upon detecting the top trailing edge 465, the sensor device that emits light beam 426 generates a distance value X3 and sends a corresponding signal, and a corresponding time value Time3 is generated.

In operation, the controller is configured to evaluate the signals generated by the sensor device that emits light beam 424 using the values X1 (shown in FIG. 12) and X2 (shown in FIG. 13) to determine the workpiece height $H_w$ as described above. The controller is also configured to operate the motor to move the saw blade 408 relative to the work surface 404 such that the height of the saw blade 408 corresponds to the workpiece height $H_w$. Once the controller determines the workpiece height $H_w$, the controller is also configured to determine a distance $d_2$ (shown in FIG. 13) between the light beams 424 and 426 based on similar triangles. Specifically, the controller applies the ratio of ($H_{sc}$ to $d_1$) to ($H_{sc}-H_w$ to $d_2$) to find $d_2$. The controller is also configured to determine the workpiece velocity $V_w$ using the values X1 and X2 as described above. Once the controller determines the workpiece velocity $V_w$, the controller is also configured to determine a distance $d_3$ (shown in FIG. 14) using the time values Time2 and Time3. Specifically, $V_w$*(Time3−Time2)=$d_3$ because the velocity $V_w$ multiplied by the time it took the workpiece to move from the detection of the top leading edge 450 to the detection of the top trailing edge 465 yields the distance $d_3$. Finally, the controller is configured to determine a length of the workpiece $L_w$ by adding $d_2$ and $d_3$. The length information can be used in a speed reduction or shut-off protocol based on the workpiece velocity $V_w$ and an elapsed time from the workpiece position shown in FIG. 14.

The automatic blade height adjustment assemblies disclosed herein can be incorporated into a variety of power tools and integrated with existing mechanical or manual blade height adjustment mechanisms. In addition, the assemblies may utilize different proximity sensors capable of determining the proximity of a workpiece, with the type of sensor modified in accordance with the material of the workpiece. For instance, a capacitive sensor may be used for a metal workpiece. The sensors may be "touchless" or may be mechanical trip type sensors. The location and positioning of the proximity sensors and laser sensor may be adjusted to the specific set-up of the power tool.

It is contemplated that the automatic height adjustment assemblies disclosed herein may be incorporated into a complete automation and control system for all aspects of the operation of a power tool or bench top tool. For instance, the assemblies may be integrated with components operable to: a) sense workpiece material to adjust blade operating parameters; b) determine and/or automatically adjust blade bevel angle; c) determine and/or automatically the position of a riving knife and/or blade guard; and/or d) detect and mitigate blade kick-back conditions. All of these components may cooperate to improve safety, convenience, performance, precision, quality and reliability of the operation of the power tool. The integrated system may also provide data for external access to monitor the performance of the power tool and/or to track and record cutting operations performed with the tool.

Exemplary features of the disclosed automatic height adjustment assembly include at least one sensor component, a control unit, and a driving unit. The at least one sensor component is, for example, a sensor, the control unit is, for example, a controller, and the driving unit is, for example, a motor. The at least one sensor component and the driving unit are operatively coupled to the control unit. The at least one sensor component is arranged relative to the power tool so as to detect the presence and outside boundaries of a workpiece adjacent to the saw blade. Upon detecting the presence and outside boundaries of a workpiece, the at least one sensor component transmits signals to the control unit. The control unit processes the transmitted signals to determine whether to operate the driving unit to raise or lower the height of the saw blade relative to the work surface.

Figure 19:
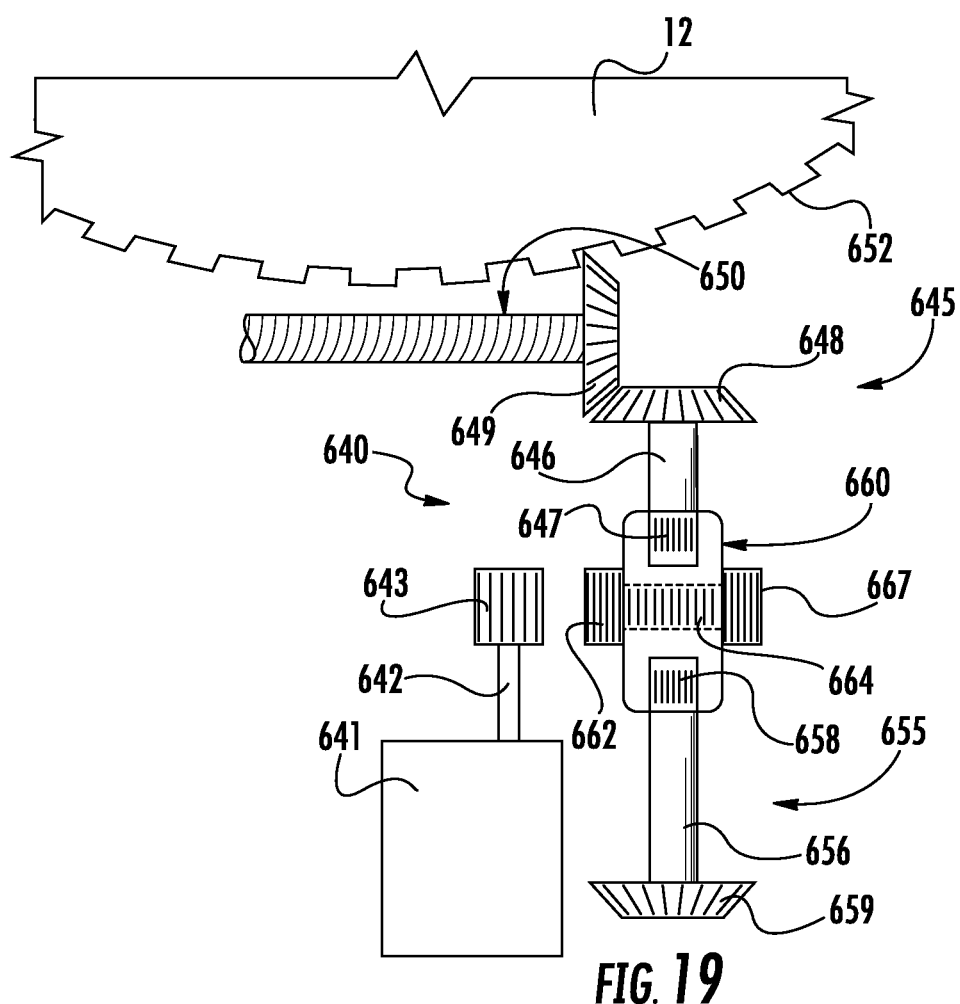
FIG. 19 is a diagram of a motor driven combined bevel and height adjustment system according to a further aspect of the present disclosure.

In another aspect of the present disclosure, a combined height and bevel adjustment mechanism 550 is provided a shown in FIGS. 15-16. In this mechanism, a motor 552 drives an output gear 553 that meshes with an input gear 554 fixed to an input shaft 55. The motor may be a reversible electric motor that is configured to permit adjustment of the motor speed and torque to thereby control the speed and torque applied to the input gear 554. The input shaft 555 is adapted to provide speed and torque to a bevel adjustment component 560 and a height adjustment component 570. The bevel adjustment component 560 includes an output shaft 562 that drives an output gear 564. The output gear 564 is configured to engage a gear arrangement associated with the carriage 12 (FIG. 1) to tilt the carriage at a desired bevel angle. In one example, the output gear 564 may be a bevel gear that engages a bevel gear 649 that drives a worm gear 650 as depicted in FIG. 19. The worm gear 650 engages teeth 652 on the carriage to tilt the carriage. It is understood that the gear arrangement may instead be associated with the table 11 to tilt the work surface T. Moreover, the bevel adjustment component 560 may be integrated with other forms of adjustment mechanisms, such as a lever-mechanism, a worm drive or other types of mechanisms.

In one feature of the combined adjustment mechanism 550, the output shaft 562 of the bevel adjustment component 560 is connected to the input shaft 555 through a torque-limiting coupling 565. The coupling 565 may include, for instance, a slip clutch 566 maintained in contact by a constant force spring 567 mounted on the input shaft 555. The slip clutch 566 and spring 567 are calibrated so that the slip clutch elements (or plates) remain in contact up to a pre-determined torque, as established by the constant force spring. (It can be appreciated that the rotational inertia of the bevel adjustment gearing that meshes with the output gear 564 also contributes to establishing a torque threshold value). Power is transmitted from the motor 552 to the input shaft 555 and to the output shaft 562 of the bevel adjustment component 560 as long as the transmitted torque is below the threshold torque value. Once the torque applied to the torque limiting coupling 565 exceeds the rated torque of the coupling, the output shaft 562 slips and no power is transmitted to the output gear 564 at which point the bevel adjustment feature stops. Consequently, whether or not the bevel adjustment component is activated depends upon the output torque of the motor 552, which is controllable by the operator. The operator control of the motor torque may be limited to actuating a bevel adjustment switch. In one embodiment, the power switch P (FIG. 1) may be modified to include left and right arrows and a horizontal toggle element for activating the bevel adjustment. However, preferably a separate switch is provided to activate the bevel adjustment such as by sending a control signal or controlled electrical current to the motor 552 sufficient to cause the motor to operate at a predetermined torque that is below the slip torque of the torque limiting coupling 565.

The adjustment system 550 further includes a height adjustment component 570 that may be powered by the same motor 552 and input shaft 555 as the bevel adjustment component. Thus, the height adjustment component includes an output shaft 572 that drives an output gear 574 that meshes with suitable gearing to move the carriage 12 up and down to adjust the saw S height relative to the work surface T. In one example, the output gear 574 is a bevel gear that engages a mating bevel gear 387 of the height adjustment system 380 shown in FIG. 9 used to adjust the blade height relative to the workpiece as described above. The mating gear 387 drives a lead screw 388 that engages a threaded collar 389 of the carriage 370.

Power is transmitted from the input shaft 555 to the output shaft 572 through a centrifugal coupling 575. The centrifugal coupling 575 includes a number of pins 576 that extend through one or more cross-bores 577 defined in the input shaft 55. Opposite pins may be connected by an extension spring 579 configured to draw the pins together inside a corresponding cross-bore. Centrifugal masses 578 are mounted to the radially outboard end of the pins 576. The pins and masses rotate with the input shaft 555 and as they rotate the masses move outward due to the centripetal force, resisted by the spring 579.

The centrifugal coupling 575 includes a transmission housing 580 that is engaged to or integral with the output shaft 572 so that output shaft and housing rotate together. The housing defines a cavity 582 that receives the end of the input shaft 555 as well as the centrifugal masses 578. The housing 580 further defines recesses 584 aligned with each centrifugal mass and sized to receive the mass 578 when they extend outward enough to engage the recess. Once engaged in the recess the rotation of the input shaft 555 is transmitted through the pins 576 and centrifugal masses 578 to the recesses 584 and to the housing 580 to thereby rotate the output shaft 572. It can be appreciated that the spring 577 between the pins 576 can be calibrated to determine the centripetal force, and therefore rotational speed, necessary for the centrifugal masses 578 to engage the recesses 584. Thus, whether or not the motor 552 drives the output gear 574 of the height adjustment component 570 depends upon the speed of the motor, which can be controlled by the operator. As with the bevel adjustment feature, the operator control may be in the nature of a vertical toggle at the power switch P. However, it is again preferable that a separate switch be provided as described above which activates the motor 552 to operate at the pre-determined rotational speed to activate the centrifugal coupling 575.

It can be appreciated that the adjustment system 550 combines the ability to adjust both bevel angle and height of the tool, such as the saw S, relative to the work surface T (whether by moving the saw or moving the work surface). Operating the motor 552 at low speeds and low torque activates the bevel adjustment component, while operating the same motor at high speeds activates the height adjustment component. It can be noted that the speed and torque relationships may be modified according to the properties of the power tool adjustment elements which may give rise to certain speed/torque thresholds. It is contemplated that the torque limiting coupling 565 of the bevel adjustment component 560 may be replaced with a centrifugal de-coupling device similar to the centrifugal coupling 575 of the height adjustment component. For the bevel adjustment component, the centrifugal coupling would be arranged so that the centrifugal masses disengage the input shaft at high rotational speeds.

In another adjustment system, the bevel angle and height adjustments are accomplished with different motors. Thus, as shown in FIG. 17, a bevel adjustment component 600 includes a housing 601 that is connected to the carriage 12 supporting the working tool S by a beam 602. The housing 601 carries a motor 604 that drives a gear train 606. The motor may be a reversible motor and may have a fixed operating speed or a controllable speed. The gear train 606 meshes with a curved rack gear 608 that is fixed to the tool housing 11. The rack gear follows the curvature of the slot 16 defined in the housing 11 for the power tool (FIG. 1). The housing 601 for the bevel adjustment component 600 is configured to be slidably engaged within the slot 16 so that the housing follows the slot as the gear train 606 moves along the fixed rack gear 608. The motor 604 may be coupled to the power switch P with modifications to accommodate a horizontal toggle or to a separate switch as described above.

The adjustment system further includes the height adjustment component 620 that includes a threaded rod 622 that carries a driven member 624 that is coupled to the carriage 12 to raise or lower the carriage as the driven member travels along the rod. The driven member includes internal threads to mesh with the threaded rod 622. The threaded rod is rotatably driven by a motor 626 that is separate from the motor 604 for the bevel adjustment component. Bearing supports 623 are provided to support the threaded rod. The height adjustment component may further include, for instance, a pair of glide shafts (or other glide mechanisms) 628 with slide elements 629 connected to the carriage 12 to help maintain smooth vertical movement of the carriage as the rotation of the threaded rod drives the driven member 624 up or down. As with the bevel adjustment component, the motor 626 of the height adjustment component 620 may be connected to the power switch P and in particular to a vertical toggle to allow independent operation of the height adjustment feature.

An alternative combined adjustment system 640 is shown in FIG. 19 in which a common motor 641 drives either of the bevel adjustment component 645 or the height adjustment component 655. The motor 641 has an output shaft 642 coupled to a driven gear 643 that engages a slide actuated clutch 660 to alternatively transfer power to one of the two adjustment components 645, 655. The bevel adjustment component 645 includes a shaft 646 with an input gear 647 at one end and an output gear 648 at an opposite end. The output gear 648 meshes with a gear 649 that drives a worm gear 650. The gears 648, 649 are preferably bevel gears, but other gears may be employed. The worm gear 650 engages teeth 652 that are part of or connected to the carriage 12 that supports the saw S and its drive motor. It can thus be appreciated that rotation of the shaft 646 causes rotation of the worm gear which rotates the carriage to adjust the bevel angle.

The height adjustment component 655 also includes a shaft 656 with an input gear 658 at one end and an output gear 659 at its opposite end. The output gear 659 is configured to engage a gear train configured to raise and lower the carriage 12. The slide actuated clutch includes a transfer gear 662 that meshes with the driven gear 643 of the motor 641. The transfer gear rotates an intermediate gear 664 that can be moved into engagement with either input gear 647 of the bevel adjustment component 645 or the input gear 658 of the height adjustment component 655. A slide switch 667 is provided to physically slide the intermediate gear toward one or the other of the input gears. The slide actuated clutch 660 may include a housing with detents for receiving and holding the switch 667 and/or intermediate gear 664 in engagement with the selected adjustment component. The clutch 660 may also incorporate a locking element that locks the shaft 646, 656 of the non-selected adjustment component against rotation, to thereby hold the adjustment component, and therefore the carriage, at the chosen bevel angle or height.

The slide clutch 660 may be modified so that the input gears 647, 658 of the two adjustment components are slidably mounted on their respective shaft 646, 656 and keyed for rotation with the shaft. The switch 667 is then operable to slide one or the other input gear along their respective shaft and into engagement with the intermediate gear 664. As a further alternative, the two input gears 647, 658 may be moved into and out of direct engagement with the driven gear 643 of the motor 641.

The adjustment systems 550, 600, 620 and 640 are motor driven so that fine adjustments of bevel angle and/or height can be obtained. The motors may incorporate appropriate gearing to calibrate the motor rotational speed to a desired adjustment accuracy, taking into account motor start-up/ shut-down characteristics as well as gear meshing or clutch activation characteristics.

Figure 20:
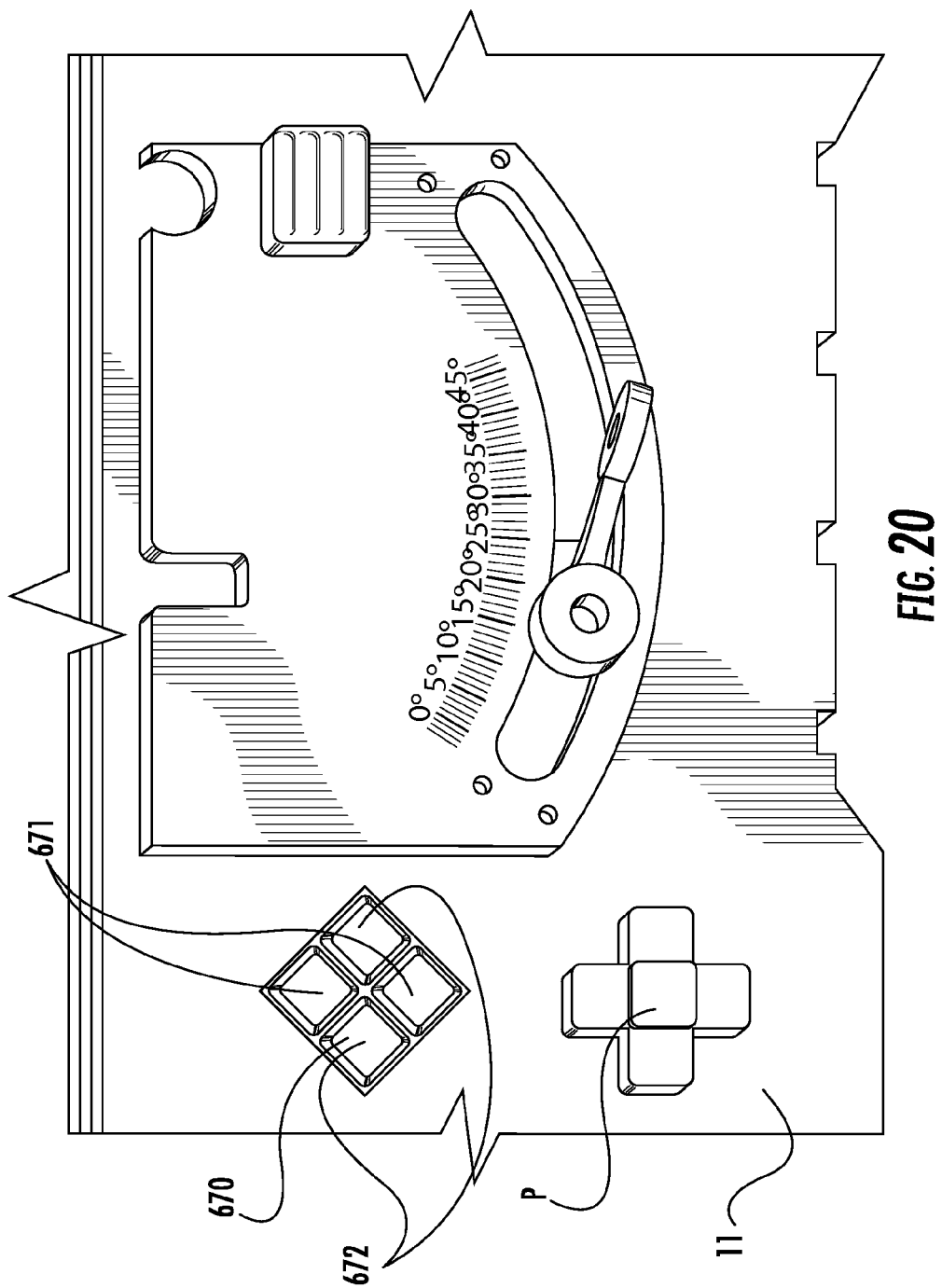
FIG. 20 is a side view of a power tool table incorporating a height and bevel adjustment switch.

As indicated above, the bevel and height adjustment features may be activated by a separate power switch. For example, as depicted in FIG. 20 a switch 670 may be mounted to the power tool table or housing 11 near the power switch P. The switch 670 includes height adjustment pads 671 arranged vertically on the switch and bevel adjustment pads 672 arranged horizontally on the switch. The switch pads may activate a toggle switch or may constitute a standard pressure switch pad.

Figure 21A:
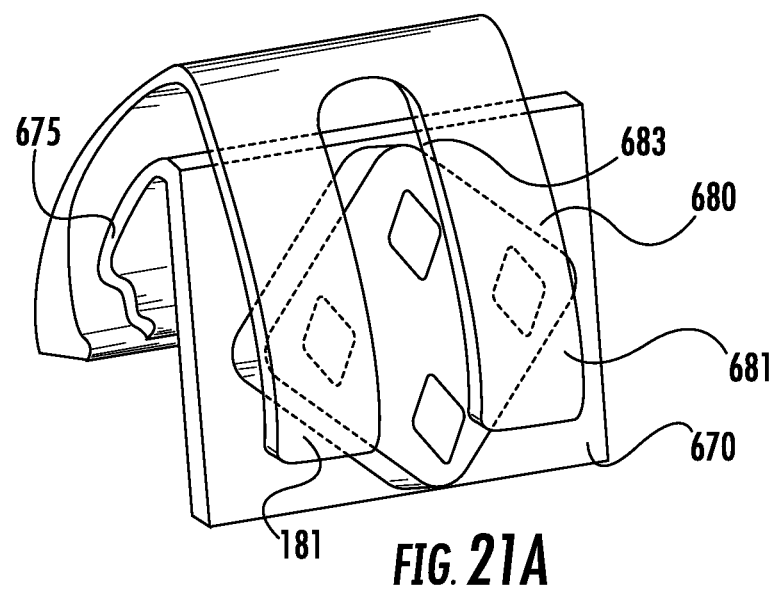
FIGS. 21(a), (b) are views of a bevel lock arrangement for use with the adjustment system of FIG. 19.
Figure 21B:
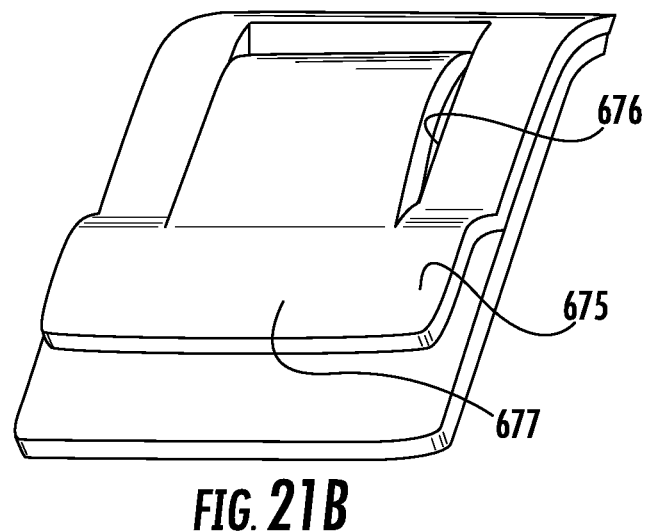

In an alternative the switch 670 may be incorporated into or mounted on the existing mechanical bevel adjustment component 15 (FIG. 1). The switch in this alternative can accommodate a bevel lock system, as illustrated in FIGS. 21(*a*)-(*b*) that is operable before the motor 641 is disengaged from the shaft 646 of the bevel adjustment component 645. As shown in FIG. 21(*a*) a clip 675 is provided that is engaged over the switch 670 and that includes a cover plate 680 having wings 681 separated by a slot 683. The wings are positioned to cover the horizontal toggle switches used to activate the bevel adjustment feature. The slot 683 allows access to the vertical adjustment toggle switches. The cover plate 680 or clip 675 may provide other features in addition to acting as a lock for the switch 670, such as a function selector for the user and an actuator for the slide clutch 660. In this latter function, the clip 675 may be configured with an opening 676 that is configured to engage an complementary configured portion of the slide clutch 660 to allow the clutch to be moved side-to-side (as described above) by movement of the clip 675 or cover plate 680.

The clip 675 may be configured as shown in FIG. 21(*b*) in a manner that physically locks the bevel adjustment mechanism 15 in place. The clip 675 may include a rear friction plate 677 that is adapted to frictionally engage the inside of the housing 15 adjacent the slot 16 to physically hold the mechanism in position.

Each of the components may be integrated with components for identifying the relative tool/blade position, such as height and bevel angle. Thus, the adjustment systems may integrate with a display that provides a visual indication of a tool angle relative to the work surface, or a relative tool height. Various sensors may be used to evaluate the actual tool/blade position, such as the sensors 110, 112, 114 discussed above. The position data may also be used to provide a feedback component in which an operator inputs a desired height or bevel angle and the adjustment components operate until the sensors indicate that the desired position has been achieved. The position data feedback can be part of a fully automated system or may be integrated with visual/ audible feedback when the adjustment is manually controlled by the operator. The position or movement of the adjustment components may alternatively be determined directly from the motor such as when the motor is a stepper motor or when the drive shaft or driven gear are encoded, wherein gear rotation is translated to a specific height or angle adjustment from a known location.

It is contemplated that the adjustment systems disclosed herein may be incorporated into a complete automation and control system for all aspects of the operation of a power tool or bench top tool. For instance, the systems may be integrated with components operable to: a) sense workpiece material to adjust blade operating parameters; b) determine and/or automatically adjust blade bevel angle; c) determine and/or automatically the position of a riving knife and/or blade guard; d) automatically adjust blade or tool height; and/or e) detect and mitigate blade kick-back conditions. All of these components may cooperate to improve safety, convenience, performance, precision, quality and reliability of the operation of the power tool. The integrated system may also provide data for external access to monitor the performance of the power tool and/or to track and record cutting operations performed with the tool. A user interface may be provided that permits user input for desired operating features of the power tool, such as a touch screen or PC interface.

The present disclosure contemplates an adjustment system for adjusting the position of a tool relative to the work surface of a portable or bench top power tool. The system includes a bevel adjustment component and a height adjustment component driven by a common motor. A coupling between the motor and both the adjustment components selectively engages one of the components with the motor to perform the corresponding adjustment feature. The coupling may be a torque limiting clutch, centrifugal clutch or slide actuated clutch. The coupling may be selectively engage one adjustment component or another as a function of selected motor operation parameters, such as speed and torque. As indicated above, the mechanical safety features, such as the riving knife, provide a great deal of protection for the tool operator while a cut is being performed on a workpiece. However, once the cut is complete the operator's attention may be directed away from the rotating saw blade 108, even if only momentarily.

According to a further feature of the present disclosure, systems are provided for automatically shutting down the drive motor for the saw blade. In one embodiment shown in FIGS. 22(*a*)-(*b*) the drive motor 118 powering the blade 108 is controlled by a controller 116 (FIG. 2). The controller 116, which may be part of the automatic height adjustment system 100 described above, is configured to sense certain operating conditions of the motor and to permit or terminate power to the motor 118. One operating condition of the drive motor 118 is the current draw of the motor. A typical drive motor for a power tool has a known current draw under no-load conditions (i.e., when the driven blade is freely spinning) and a known current draw when the motor is loaded, such as when the drive saw blade is in contact with a workpiece W as shown in FIG. 22(*a*). The motor current may also have a known value after a cut has been completed but while the workpiece W is still adjacent the saw blade 108, as shown in FIG. 22(*b*). It is known that the motor current draw is greater during load operation than during no-load operation of the motor. Another motor operating condition may include the motor voltage, which may change between load and no-load operation. A physical differentiation condition may be the mechanical and audio vibration of the drive assembly or motor that can differ between no-load and cutting operation of the tool.

Figure 22A:
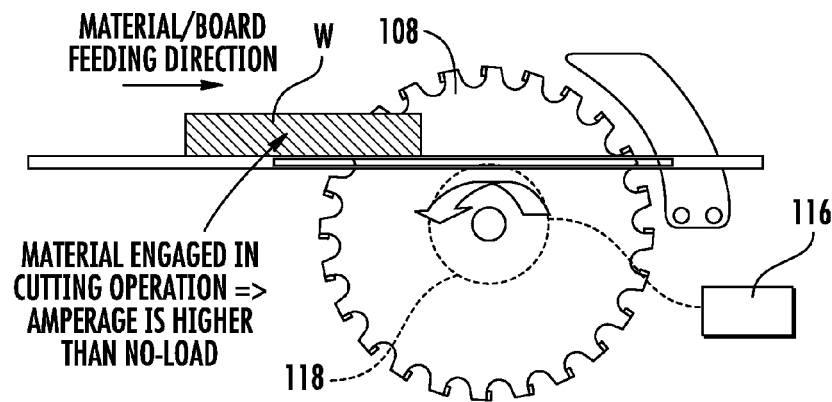
FIGS. 22(a) and 22(b) are diagrams of a workpiece during and after performing a cut with the saw blade of a power tool with the drive motor for the power tool operating at first and second conditions.
Figure 22B:
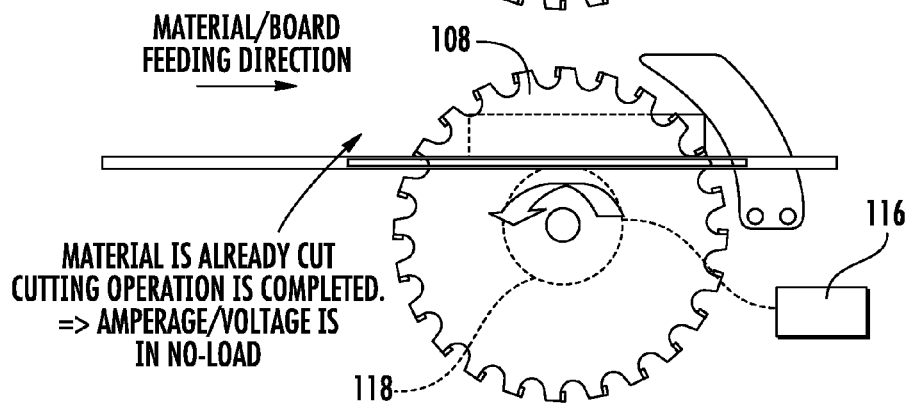

The controller 116 is configured to sense the motor operating condition, such as the current draw, while the motor 118 is operating. For instance, the controller may incorporate a known current sensor to determine the current draw of the motor. When the sensed current is at the load condition current the controller "knows" that the cutting operation is in process because the workpiece W is loading the drive motor for the cutting blade 108, as shown in FIG. 22(a). However, once the cut is complete, as shown in FIG. 22(b), the current draw decreases and this change is sensed by the controller 116. The controller thus determines that the cut is complete and disengages the drive motor 118, such as by deactivating an internal switch that cuts power to the motor. In addition, the controller may activate a braking component to help decelerate and stop the blade in a short period of time.

In one aspect, the controller 116 may be configured to operate as a go/no-go gage, meaning that while the motor operating condition is at a predetermined level electrical power is supplied to the motor, but once the operating condition falls below that predetermined level electrical power to the motor is terminated. In this instance, the current sensor may be a solenoid switch that is deactivated if the current falls below the solenoid threshold. In another alternative, the controller 116 may incorporate a current sensor capable of real-time evaluation of the current magnitude for comparison at short intervals. In this alternative, the controller may determine a current delta or differential, by comparing the motor current at one time interval to either a nominal operating current or to the motor current at an immediately prior time interval. If the motor current delta falls outside a predetermined threshold, the controller terminates power to the drive motor. In yet another alternative, the motor operating condition protocol may be established "on the fly", meaning that the motor operating conditions sensed when the cutting operation is commenced are used as the initial conditions to which subsequent motor conditions are compared.

Figure 23A:
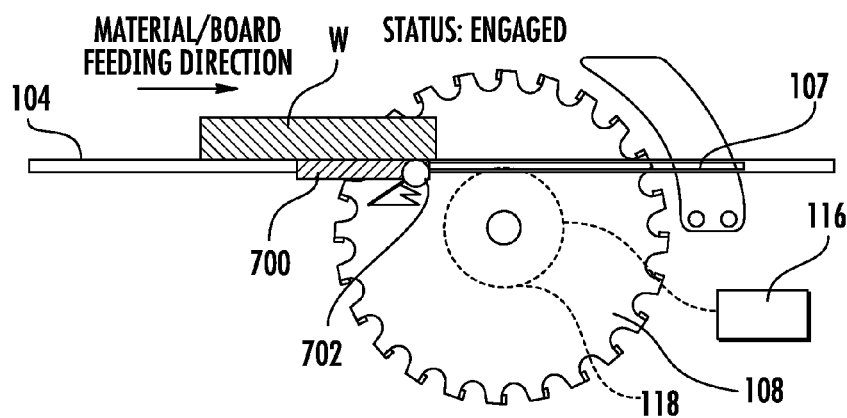
FIGS. 23(a) and 23(b) are diagrams of a workpiece during and after performing a cut with the saw blade of a power tool, the power tool including a workpiece sensor shown in an engaged and a disengaged state.
Figure 23B:
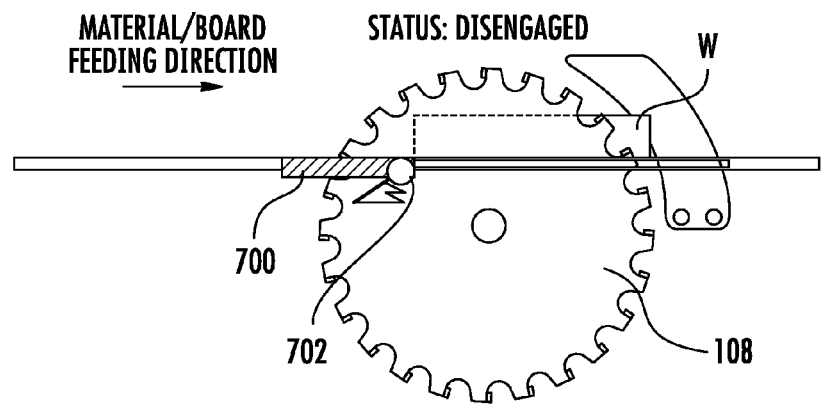

Another automatic speed regulation/speed reduction/shut-off system may incorporate a mechanical component, such as the component 700 associated with the work surface 104 adjacent the leading end of the blade slot 107 and cutting blade 108, as depicted in FIGS. 23(a), (b). The mechanical component 700 may take several forms capable of sensing physical contact and generating a signal that is used by the controller 116 to deactivate the drive motor 118. For example, the component 700 may have a capacitive touch system, a projective touch system, or a touch sensitive surface, similar to touch pad of computer keyboard or the like. The component 700 may be an element induced by external stimulus such as magnetic field, temperature, light, or the like. Alternatively the component 700 may be in the form of a pressure switch that makes or breaks an electrical contact depending upon whether a workpiece W is positioned on the switch. The pressure switch may take on various forms, such as the spring biased ball 702 depicted in FIG. 23(a). As a further alternative, the component 700 may be a resistance or capacitive element that is capable of determining material density. With this alternative, the controller 116 may use the material density information to regulate the speed of the blade during the cutting operation that is most appropriate to the density of the workpiece material. As shown in this figure, when the workpiece is present the ball 702 is depressed into or below the work surface 104. In this position the ball may close a switch so that a "workpiece present" signal is transmitted to the controller 116. However, once the cut is complete the workpiece has moved beyond the ball 702 so that the spring pushes the ball upward, as shown in FIG. 23(b). In this position the ball breaks the switch contact and this condition is sensed by the controller 116 to terminate power to the motor 118.

As can be appreciated form FIG. 23(b), the mechanical component 700 is preferably positioned to overlap the cutting blade 108 since the workpiece W is not fully cut until the workpiece has traversed part of the blade. Consequently, the component 700 may be oriented lateral adjacent the blades slot 107. The component may be disposed on one side of the slot or may straddle the slot. In some embodiments, the component may be integrated into the table top or the frame. In other embodiments, the component is a sensor package with a housing and the package housing is formed as part of the table top or the frame. In yet other embodiments, the component is a sensor strip disposed around the periphery of the blade slot 107. As shown in FIG. 23(a) the component may extend beyond the leading end of the slot 107, depending upon the form of the component. Even if the component 700 includes the ball sensor 702, several such mechanical elements may be dispersed around the slot 107. Providing additional mechanically sensed surface area around the cutting blade reduces the risk of a false negative or a false positive.

Figure 24A:
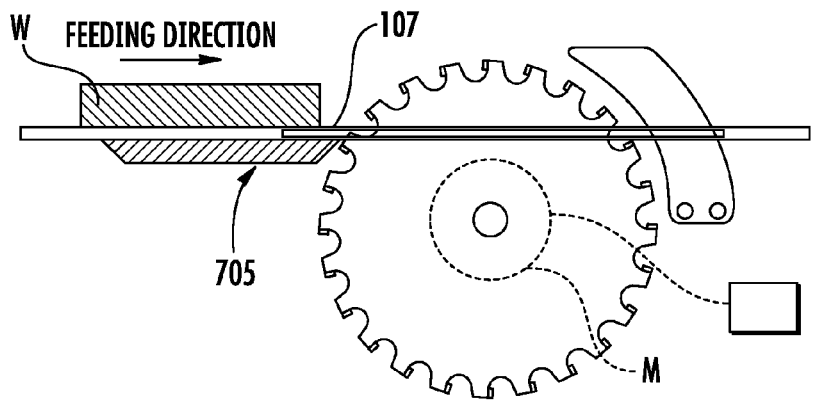
FIGS. 24(a) and 24(b) are diagrams of a workpiece prior to and after performing a cut with the saw blade of a power tool, the power tool including a workpiece sensor shown in a detected and a non-detected state.
Figure 24B:
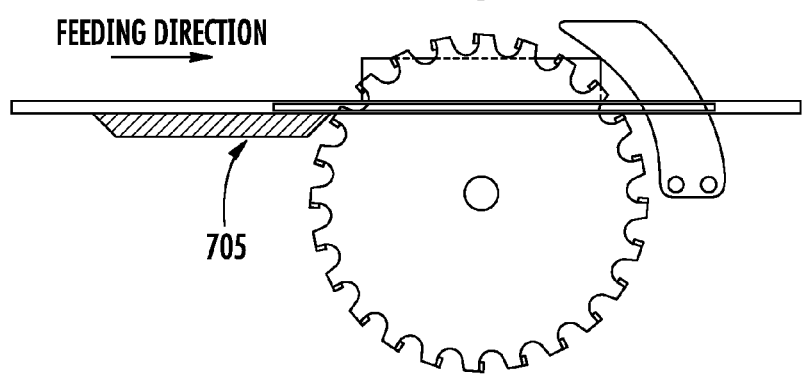

In the embodiment shown in FIGS. 24(a), (b) the power tool is provided with a material sensor 705 that is configured to sense the material of the workpiece W. The sensor 705 is a non-contact sensor, meaning that it relies upon the transmission and reception of a beam, such as a light beam, or a wave, such as an electromagnetic field. The sensor 705 may be part of a system for controlling the motor operation based on the type of material encountered by the cutting blade 108. For an automatic shut-off feature the controller 116 only requires some signal from the sensor, independent of information related to the material of the workpiece. As shown in FIG. 24(a), the sensor 705 may overlap the slot 107, and depending upon the type of sensor may require access through the slot to "see" the workpiece W.

Figure 25A:
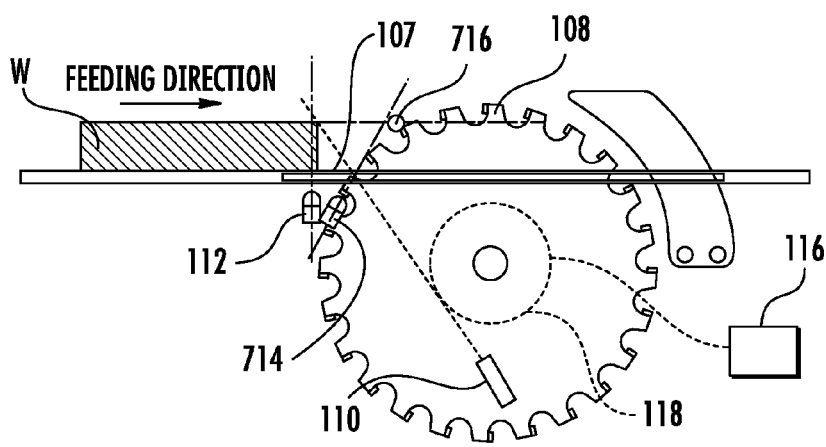
FIGS. 25(a) and 25(b) are diagrams are diagrams of a workpiece prior to and after performing a cut with the saw blade of a power tool, the power tool including a sensor for blade height adjustment system, with the sensor shown in a detected and a non-detected state.
Figure 25B:
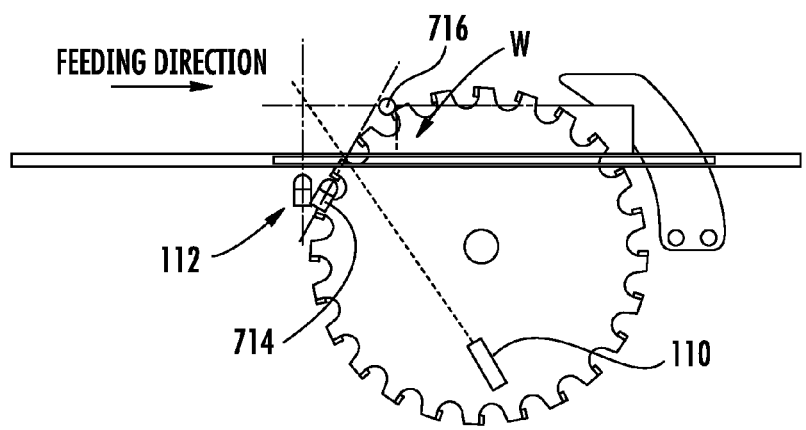

The embodiment of FIGS. 25(a), (b) utilizes the sensors from the height adjustment system 100 described above, namely the proximity sensors 112, 114 and the laser sensor 110. As with the material sensor 705, the controller 116 only requires a signal from either of the sensors 110, 112, 114 as an indication of the presence or absence of the workpiece W. In a modification of the system 100, the downstream sensor 114 is modified so that the beam is at an a non-perpendicular angle. In particular, the sensor 714 is aligned to emit a beam through the blades slot 107 toward a predetermined location 716 that is calibrated to the location at which the workpiece has been fully cut by the saw blade. The controller 116 may thus rely upon the signal from the sensor 714 to indicate when the workpiece cut is complete, and rely upon the signal from either sensor 110 or sensor 112 to indicate that a cut is in process. While the sensors are providing a signal the controller 116 can keep the drive motor 118 energized. It can be appreciated that the sensors 110, 112 will sense an absence of a workpiece once the workpiece moves past the leading end of the blades slot 107, but while the workpiece is still in contact with the blade. Thus, the controller will only rely upon the signal from sensor 714 to activate the automatic shut-off feature.

Figure 26:
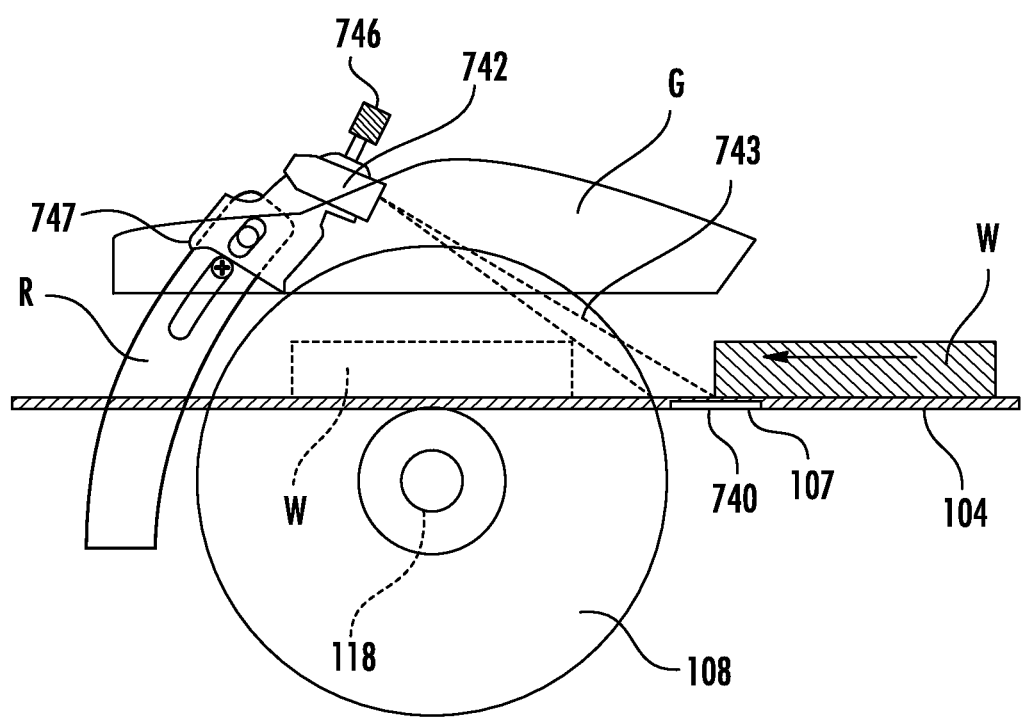
FIG. 26 is a diagram of a workpiece sensor according to a further embodiment of the present disclosure.

The automatic speed adjustment/shut-off feature may be incorporated into other safety features of the power tool, such as in association with the riving knife R and/or upper guard G, as shown in FIG. 26, that are arranged to protect the blade 108. In this embodiment, a sensor 740 is positioned at the leading end of the blade slot 107. An optical source 742 is mounted on the riving knife R, as illustrated, or on the guard G, so that an optical beam 743 is directed at the sensor 740. The optical source 742 may include adjustment components 746, 747 to properly align the beam 743 to shine directly onto the sensor. When the workpiece W overlaps the sensor 740 it interrupts the beam 743 so that the sensor transmits a signal indicative of the presence of a workpiece entering the cutting region of the tool. Once the cut is complete, the workpiece W' no longer intersects the beam 743 so the sensor transmits a signal indicating that a workpiece is no longer within the cutting region, thereby initiating the automatic speed reduction/shut-off feature described above.

The sensor and optical source can be of any type capable of sending and receiving a narrow or collimated beam. The sensor 740 may be a variety of optical sensors, such as a CCD array, a pixel-based sensor plate, and the like. The optical source and sensor may be configured for various light wavelengths, such as infrared or visible spectrum light. The optical device 742 is illustrated in FIG. 26 as mounted on an existing safety component (i.e., riving knife R) of the power tool; however, the optical device may be carried by a separate support component that is mounted on the power tool, clear of the workpiece, but arranged to direct a beam 743 onto the sensor 740.

It can be appreciated that the automatic shut-off features disclosed herein may be used in combination with a system for controlling the overall operation of the power tool, both from a performance and a safety standpoint. The controller 116 may be thus be part of an overall system controller or may be directly associated with the drive motor. It is contemplated that the controller is activated immediately when the operator activates the power tool, such as by actuating the power switch for the unit. The controller 116 may prevent activation of the drive motor unless and until a workpiece is sensed at the leading end of the blade slot 107, or may integrate with other controllers that control activation of the drive motor as part of other features, such as height adjustment, safety component detection, and the like.

While the invention has been illustrated and described in detail in the drawings and foregoing description, the same should be considered illustrative and not restrictive in character. Only the preferred embodiments have been presented and all changes, modifications and further applications that come within the spirit of the invention are desired to be protected.

What is claimed is:

1. A height adjustment system in combination with a power tool having a table with a work surface for supporting a workpiece, a saw blade extending through a slot in the table surface, a carriage supporting the saw blade and a motor for driving the saw blade, and an adjustment mechanism for adjusting the height of the saw blade above the surface, the height adjustment system comprising:
    an adjustment motor configured to drive the adjustment mechanism to increase or decrease the height of the saw blade relative to the work surface;
    a movable sensor movably supported relative to the table and movable in response to movement of the adjustment mechanism, the movable sensor configured to direct a movable sensing beam at a non-perpendicular angle relative to the work surface, the beam passing through a position above the work surface directly above a predetermined location along the work surface, which position above the work surface is calibrated to the height of the saw blade, the movable sensor further configured to generate a movable sensor signal in response to detecting detection of the workpiece in the path of the movable sensing beam;
    a controller configured for controlling the adjustment motor to change the height of the saw blade relative to the work surface in response to said movable sensor signal; and
    a first sensor directly below said predetermined location and configured to direct a first sensing beam upward through the slot substantially perpendicular to the work surface to intersect said movable sensor beam and to generate a first sensor signal in response to the detection of the workpiece in the path of said first sensing beam,
    wherein the controller is configured to control the adjustment motor in response to said movable sensor signal only upon receipt of said first sensor signal.

2. The height adjustment system in combination with the power tool of claim 1, wherein:
    the movable sensor is movable in response to movement of the adjustment mechanism to change said position above the work surface; and
    the controller is configured to cause the adjustment motor to drive the adjustment mechanism until the upper edge of the workpiece at said predetermined location is detected in response to the movable sensor signal.

3. The height adjustment system in combination with the power tool of claim 2, wherein the controller is configured to detect the upper edge of the workpiece in response to a change of state of the movable sensor signal between detecting and not detecting the workpiece in the path of said movable sensing beam.

4. The height adjustment system in combination with the power tool of claim 1, further comprising:
    a second sensor at a location between the saw blade and said predetermined location, said second sensor configured to direct a second sensing beam upward through the slot substantially perpendicular to the work surface and to generate a second sensor signal in response to the detection of the workpiece in the path of said second sensing beam; and
    wherein said controller is configured to stop the adjustment motor upon receipt of said second sensor signal.

5. The height adjustment system in combination with the power tool of claim 1, further comprising:
    a user interface operable to generate a stop signal directing the user to stop moving the workpiece and a go signal directing the user to move the workpiece to the saw blade; and
    said controller is configured to direct the user interface to generate the stop signal upon receipt of said first sensor signal and to direct the user interface to generate the go signal in response to detection of the upper edge of the workpiece.

6. The height adjustment system in combination with the power tool of claim 1, wherein said movable sensor is movable in response to movement of the adjustment mechanism so that said position of said movable sensing beam is maintained equal to the blade height.

7. The height adjustment system in combination with the power tool of claim 1, wherein said movable sensor is movable in response to movement of the adjustment mechanism so that said position of said movable sensing beam is maintained equal to a predetermined percentage of the blade height not equal to 100% of said blade height.

8. The height adjustment system in combination with the power tool of claim 1, wherein said controller is further configured to determine a workpiece velocity in response to detection by said movable sensor of the upper edge and the lower edge of the workpiece as it moves toward the saw blade.

* * * * *

UNITED STATES PATENT AND TRADEMARK OFFICE
CERTIFICATE OF CORRECTION

PATENT NO. : 9,873,158 B2  
APPLICATION NO. : 14/205664  
DATED : January 23, 2018  
INVENTOR(S) : Koegel et al.

Page 1 of 1

It is certified that error appears in the above-identified patent and that said Letters Patent is hereby corrected as shown below:

On the Title Page

1: Item (54) should read:
IMPROVEMENTS TO ADJUSTMENT AND CONTROL FEATURES FOR A POWER TOOL 2: The OTHER PUBLICATIONS subsection of Item (56) should read:
OTHER PUBLICATIONS
International Search Report and Written Opinion corresponding to
PCT Application No. PCT/US2014/024032, mailed Jul. 30, 2014 (13 pages).

In the Claims

3: In Column 22, Lines 9-12, Lines 19-22 of Claim 1 should read:
the height of the saw blade, the movable sensor further
configured to generate a movable sensor signal in
response to detecting the workpiece in the
path of the movable sensing beam;

Signed and Sealed this
Twenty-ninth Day of May, 2018

Andrei Iancu
*Director of the United States Patent and Trademark Office*